US008000714B2

(12) United States Patent
Matsumoto et al.

(10) Patent No.: US 8,000,714 B2
(45) Date of Patent: Aug. 16, 2011

(54) INTERFERENCE PREDICTION APPARATUS, INTERFERENCE PREDICTION METHOD, AND INTERFERENCE PREDICTION PROGRAM IN COMPUTER-READABLE MEDIUM

(75) Inventors: Akira Matsumoto, Tokyo (JP); Tetsuya Ito, Tokyo (JP)

(73) Assignee: NEC Communications Systems, Ltd., Tokyo (JP)

( * ) Notice: Subject to any disclaimer, the term of this patent is extended or adjusted under 35 U.S.C. 154(b) by 1068 days.

(21) Appl. No.: 11/826,190

(22) Filed: Jul. 12, 2007

(65) Prior Publication Data

US 2008/0019324 A1 Jan. 24, 2008

(30) Foreign Application Priority Data

Jul. 13, 2006 (JP) ................................ 2006-193105
Jul. 6, 2007 (JP) ................................ 2007-178584

(51) Int. Cl.
*H04W 72/00* (2009.01)

(52) U.S. Cl. ..................... 455/450; 455/63.1; 455/67.13

(58) Field of Classification Search .................. 455/450, 455/451, 452.1, 452.2, 456.1, 464, 41.2, 455/41.3, 509, 512, 513, 516, 63.1, 67.13, 455/524
See application file for complete search history.

(56) References Cited

U.S. PATENT DOCUMENTS 6,052,596 A * 4/2000 Barnickel ..................... 455/450
2005/0215268 A1* 9/2005 Cheng ........................ 455/456.1

FOREIGN PATENT DOCUMENTS

JP 9-37339 2/1997
JP 2001-244901 9/2001
JP 2003-259434 9/2003
JP 3600568 9/2004

* cited by examiner

*Primary Examiner* — Lana N Le
*Assistant Examiner* — Ping Y Hsieh
(74) *Attorney, Agent, or Firm* — McGinn IP Law Group, PLLC

(57) ABSTRACT

An interference prediction apparatus capable of predicting a wireless channel in which channel interference occurs, measures a received signal strength for each wireless channel and predicts an interference area of the wireless channel in which channel interference occurs for each wireless channel on the basis of the received signal strength for each wireless channel.

10 Claims, 20 Drawing Sheets

| | |
|---|---|
| CONNECTION INFORMATION | BSSID 5 |
| WIRELESS CHANNEL | 14 ch |
| INTERFERENCE INFORMATION | 0 |

FIG. 16

| CONNECTION INFORMATION | BSSID1 | BSSID2 | BSSID3 | BSSID4 | BSSID5 |
|---|---|---|---|---|---|
| WIRELESS CHANNEL | 1ch | 6ch | 6ch | 11ch | 14ch |
| RECEIVED SIGNAL STRENGTH (r) | 90 | 65 | 41 | 28 | 55 |
| CHANNEL SCAN INFORMATION (Sj) | 100 | 138 | 138 | 38 | 55 |
| INTERFERENCE INFORMATION (C) | 10 | 73 | 97 | 10 | 0 |

DIAGRAM ILLUSTRATING ENVIRONMENTAL CONDITIONS (MAP INFORMATION) ON INSIDE OF OFFICE IN WHICH WIRELESS BASE STATION AP IS INSTALLED

INTERFERENCE PREDICTION APPARATUS, INTERFERENCE PREDICTION METHOD, AND INTERFERENCE PREDICTION PROGRAM IN COMPUTER-READABLE MEDIUM

This application is based upon and claims the benefit of priority from Japanese patent application No. 2006-193105, filed on Jul. 13, 2006, the disclosure of which is incorporated herein in its entirety by reference.

BACKGROUND OF THE INVENTION

1. Field of the Invention

The present invention relates to an interference prediction apparatus, an interference prediction method, and an interference prediction program in a computer-readable medium capable of predicting an occurrence of channel interference.

2. Description of Related Art

Recently, a wireless LAN has been rapidly distributed due to easy installation. A plurality of apparatuses is designed to wirelessly communicate with one another via the wireless LAN.

When 2.4 GHz IEEE802.11b is applied, non-interfering (non-overlapping) wireless channels include, in 2.4 GHz wireless LAN, at most three channels (for example, 1ch, 6ch, and 11ch) in the USA.

The maximum range of the wireless channel is different depending on wireless systems or countries, the number of non-interference (non-overlapped) wireless channels is also different depending on wireless systems or countries.

Accordingly, when a plurality of wireless apparatuses is used, a problem of channel interference becomes serious.

When the channel interference occurs, problems such as throughput deterioration or communication failure take place.

To avoid the channel interference caused from the aforementioned problems, it is required to use unused wireless channels that are not used by neighboring wireless apparatuses or wireless channels of which an occurrence rate of channel interference is low as communication channels.

However, much effort is needed to manually set the unused wireless channel or wireless channel of which the occurrence rate of the channel interference is low.

For this reason, Japanese Patent No. 3600568 (document 1) discloses a technique of automatically allocating an empty channel that is not used by neighboring wireless apparatuses as a communication channel.

In the technique of document 1, a beacon is detected by using an arbitrary wireless channel. When no beacon is detected, the arbitrary wireless channel used is set as a communication channel.

However, in IEEE802.11b or IEEE802.11g, the channel interference occurs in a predetermined range (for example, within a range of four wireless channels including 1ch to 4ch) of adjacent wireless channels.

Thus, even if a wireless channel in which no beacon is detected is set as a communication channel by applying the technique of document 1, channel interference may occur when a wireless channel is set as a new communication channel within a predetermined range of a neighboring wireless channel.

That is, in document 1, there is no disclosure of predicting an occurrence of the channel interference when a wireless channel is to be allocated.

Japanese Patent Application Laid-Open No. 2003-259434 (document 2) discloses a wireless communication terminal including: means for switching a communicable communication frequency by switching a frequency band used; empty state detection means for detecting an empty state of a frequency band among a plurality of frequency bands; propagation path state detection means for detecting a state of a propagation path in a frequency band among the plurality of frequency bands; and suitable frequency selection means for selecting the frequency band used on the basis of the empty state and the state of the propagation path, the wireless communication terminal selecting a frequency band that satisfies conditions from the plurality of frequency bands and enables communication.

Japanese Patent Application Laid-Open No. 2001-244901 (document 3) discloses a technique of recording a received wave together with time information as a frequency spectrum, extracting features of a spectrum pattern of the received wave by comparing the spectrum pattern of the recorded received wave with a typical spectrum pattern, and examining a use of a wave based on the features of the spectrum pattern of the received wave.

However, the technique of detecting the state of the propagation path of the frequency band in document 2, and the technique of extracting features of the spectrum pattern by comparing the spectrum pattern of the received wave with the typical spectrum pattern in document 3 are responsible for increasing costs of apparatuses.

Accordingly, it is desired to predict a wireless channel in which channel interference occurs by using existing information.

In addition, Japanese Patent Application Laid-Open No. 9-37339 (document 4) discloses a technique of retrieving a wireless communication channel that satisfies predetermined required quality conditions based on required communication types, allocating a wireless communication channel, and improving a frequency use efficiency of the wireless channel.

However, document 4 discloses improving the frequency use efficiency of the wireless channel in a mobile communication method. For this reason, even if the technique of document 4 is applied to a wireless LAN, it is impossible to avoid an occurrence of channel interference unique to the wireless LAN.

There is also a document which discloses an active or passive scan method, a spectrum, or a spectrum mask technique (see, for example, ISO/IEC 8802-11 IEEE Std 802.11 Second edition 2005-08-01 ISO/IEC 8802 11:2005(E) IEEE Std 802.11i-2003 Edition, Information technology—Telecommunications and information exchange between systems—Local and metropolitan area networks—Specific requirements Part 11: Wireless LAN Medium Access Control (MAC) and Physical Layer (PHY) specifications (Includes IEEE Std 802.11, 1999 Edition: IEEE Std 802.11a.-1999; IEEE Std 802.11b.-1999; IEEE Std 802.11b.-1999/Cor 1-2001; and IEEE Std 802.11d.-2001)).

SUMMARY OF THE INVENTION

An exemplary feature of the invention is to provide an interference prediction apparatus, an interference prediction method, and an interference prediction program in a computer-readable medium capable of predicting a wireless channel in which channel interference occurs.

An interference prediction apparatus according to an exemplary aspect of the invention predicts a wireless channel in which channel interference occurs, and includes a measurement unit that measures a received signal strength for each wireless channel and a prediction unit that predicts an interference area of the wireless channel in which channel interference occurs for each wireless channel on the basis of the received signal strength for each wireless channel.

An interference prediction method according to an exemplary aspect of the invention includes measuring a received signal strength for each wireless channel and predicting an interference area of the wireless channel in which channel interference occurs on the basis of the received signal strength for each wireless channel.

An interference prediction program in a computer-readable medium according to an exemplary aspect of the invention causes a computer to perform a measurement process of measuring a received signal strength for each wireless channel and a prediction process of predicting an interference area of the wireless channel in which channel interference occurs on the basis of the received signal strength for each wireless channel.

BRIEF DESCRIPTION OF THE DRAWINGS

Features of the disclosed embodiments will be described by way of the following detailed description with reference to the accompanying drawings in which:

FIG. 12 illustrates a detailed configuration of dependent wireless base station information 418 shown in FIG. 11;

FIG. 16 is a diagram illustrating a calculation result obtained by specifying a wireless base station AP of a current system based on the measurement result shown in FIG. 15 and calculating interference information C of the specified wireless base station AP;

DESCRIPTION OF EXEMPLARY EMBODIMENTS

First, an outline of an interference prediction apparatus will be described with reference to FIG. 1.

The interference prediction apparatus (corresponding to a wireless base station AP or wireless terminal apparatus STA) is an interference prediction apparatus AP or STA for predicting a wireless channel in which channel interference occurs (will occur).

The interference prediction apparatus AP or STA measures a received signal strength for each wireless channel and predicts an interference area of a wireless channel in which channel interference occurs (will occur) for each wireless channel on the basis of the received signal strength for each wireless channel.

This makes it possible for the interference prediction apparatus AP or STA to predict a wireless channel in which channel interference occurs (will occur).

In addition, since the interference prediction apparatus AP or STA predicts the interference area of the wireless channel in which channel interference occurs for each wireless channel, it is possible to predict a wireless channel in which channel interference occurs by using information on a received signal strength for each existing wireless channel.

Hereinafter, the interference prediction apparatus will be described with reference to the accompanying drawings.

Although the interference prediction apparatus is described as a wireless base station AP or wireless terminal apparatus STA in the following exemplary embodiments, any apparatus that acquires information on a received signal strength for each wireless channel can be applied to the interference prediction apparatus.

First Exemplary Embodiment

<System Configuration of Wireless Communication System>

First, a system configuration of a wireless communication system will be described with reference to FIG. 1.

The wireless communication system includes a plurality of wireless terminal apparatuses STA and a wireless base station AP.

The wireless base station AP includes wired interfaces 120 used to access an external network NW and wireless interfaces 110 for accessing the wireless base station AP or wireless terminal apparatuses STA.

Each of wireless terminal apparatuses STA includes a wireless interface 110 used to access the wireless base station AP or another wireless terminal apparatus STA.

<Internal configuration of Wireless Base Station AP>

Next, an internal configuration of the wireless base station AP will be described with reference to FIG. 2.

Figure 2:
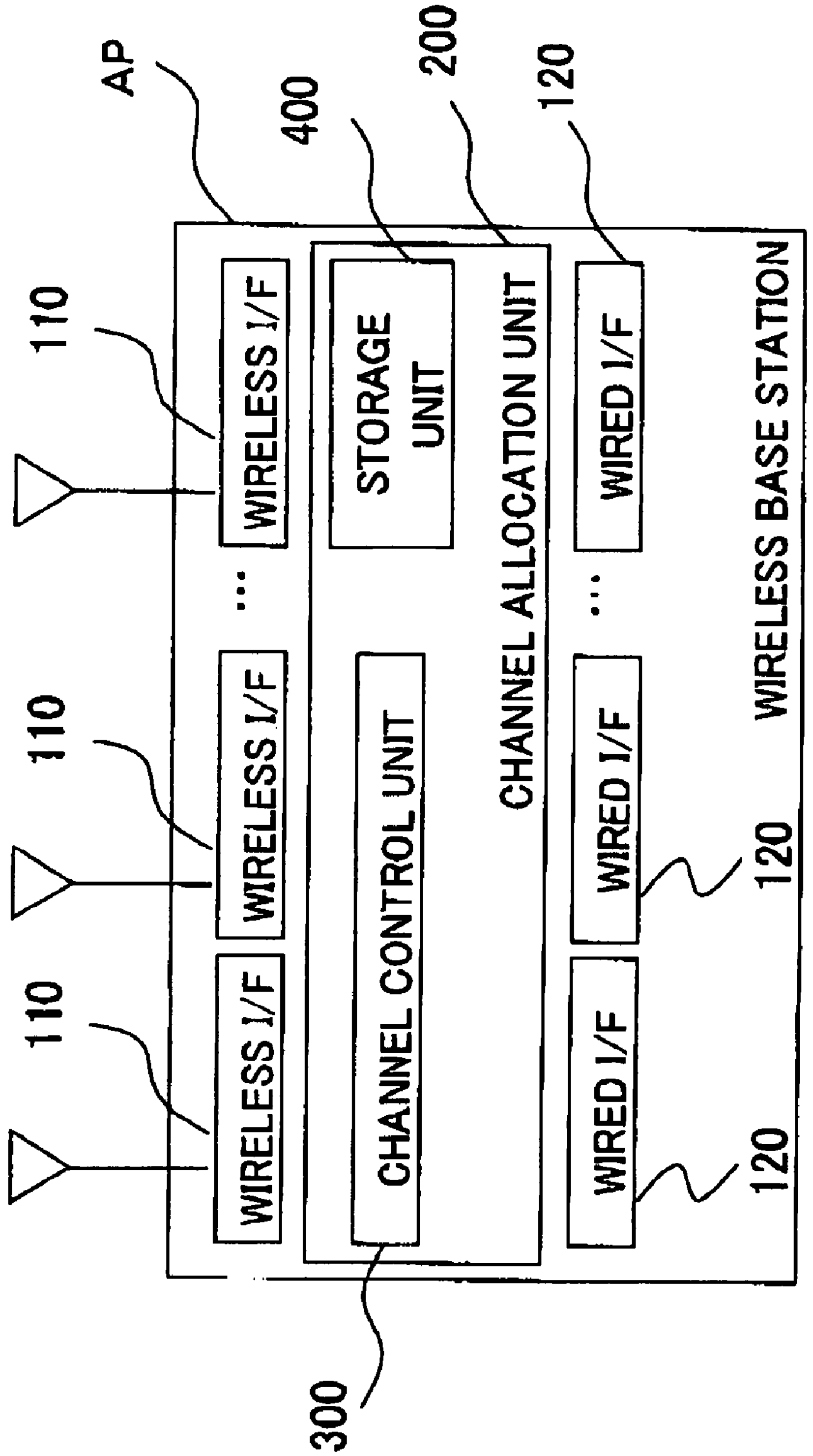
FIG. 2 is a diagram illustrating an internal configuration of a wireless base station AP constituting the wireless communication system.

As shown in FIG. 2, a wireless base station AP includes wireless interfaces 110, wired interfaces 120, and a channel allocation unit 200.

The wireless interfaces 110 are designed to perform wireless communication. The wireless base station AP includes at least one wireless interface 110.

It is possible to apply wireless interfaces having the same wireless specification (signal strength, directivity, and the like) or wireless interfaces having different wireless specifications to the wireless interfaces 110.

The wired interfaces 120 are designed to perform communication in a wired manner. In the wireless base station AP, as shown in FIG. 1, the wireless base station AP which is connected to the external network NW may include the wired interfaces 120, while the wireless base station AP which is not connected to the external network NW needs not include any wired interface 120. The number of the wired interfaces mounted on the wireless base station AP is not specifically limited.

The channel allocation unit 200 is designed to allocate wireless channels.

The channel allocation unit 200 includes a channel control unit 300 and a storage unit 400.

The channel control unit 300 is designed to allocate a wireless channel suitable for the wireless interface 110 on the basis of information stored in the storage unit 400.

The storage unit 400 is designed to store information used to allocate a wireless channel to the wireless interface 110.

Figure 3:
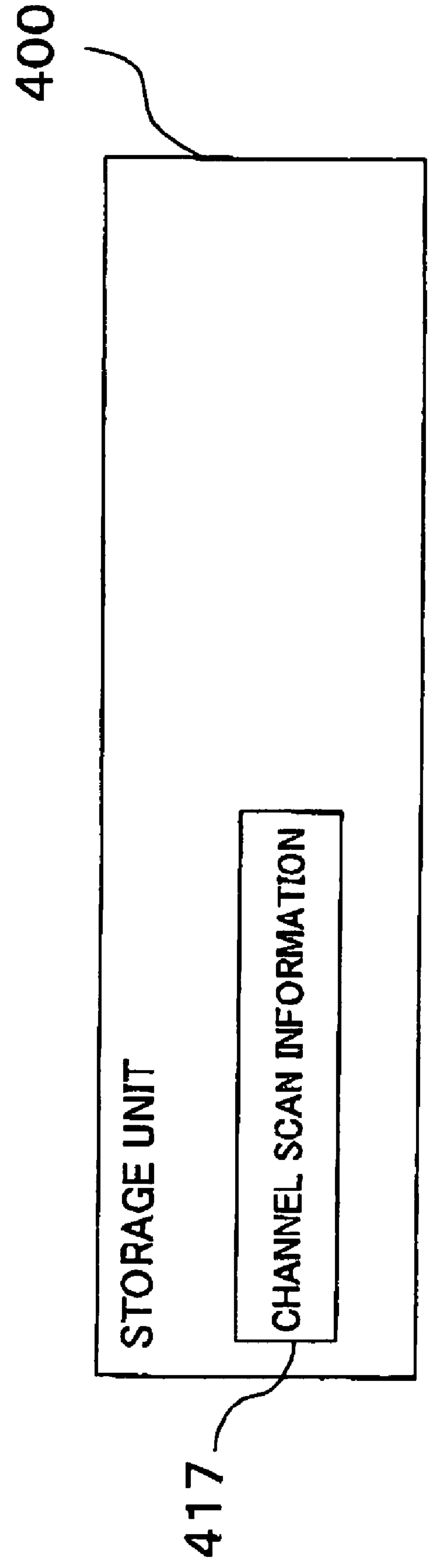
FIG. 3 is a diagram illustrating an internal configuration of a storage unit 400 of the wireless base station AP that constitutes the wireless communication system.

As shown in FIG. 3, the storage unit 400 stores channel scan information 417.

The channel scan information 417 is used to manage a received signal strength for each channel that is available by the wireless base station AP.

The channel scan information 417 is generated based on a usage state of wireless channels used by wireless apparatuses (for example, wireless terminal apparatuses STAs or another wireless base station AP) existing in the vicinity of the wireless base station AP.

<Intra-Company Wireless Access System>

Next, with reference to FIG. 4, description will be given to a case where an intra-company wireless access system is constructed by using the wireless base station shown in FIG. 2.

Figure 4:
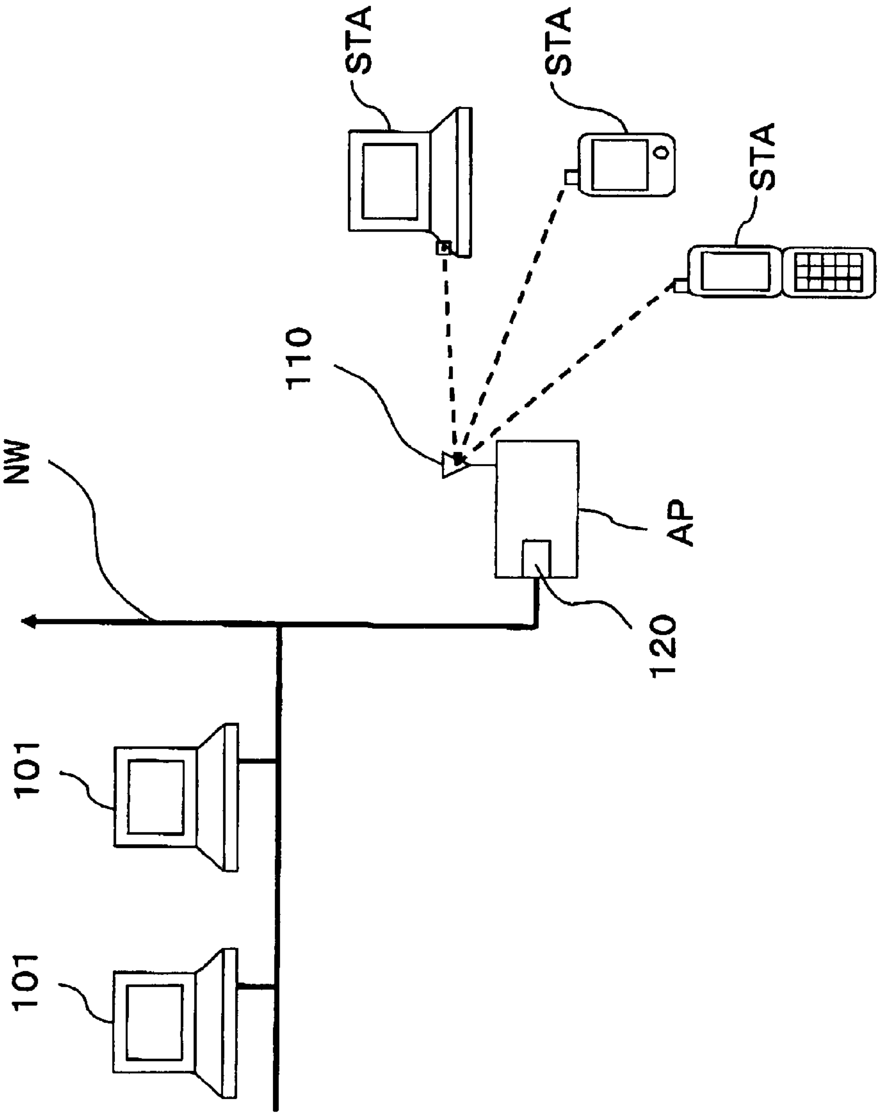
FIG. 4 is a diagram illustrating a configuration of an intra-company wireless access system configured by connecting a wireless base station AP that constitutes the wireless communication system.

In an example of the system configuration of the intra-company wireless access system shown in FIG. 4, one wireless base station AP is connected to an intra-company network. NW. Wired terminal apparatuses 101 are connected to the intra-company network NW.

The wired terminal apparatuses 101 indicate apparatuses which are connected to the intra-company network NW by using a wired interface 120.

The wireless base station AP is connected to the intra-company network NW by using the wired interface 120.

Also, the wireless base station AP performs wireless communication with wireless terminal apparatuses STA through a wireless interface 110 by establishing a wireless channel.

The wireless terminal apparatus STA may be a wireless apparatus such as a PC, a PDA, a mobile phone, etc.

Any wireless apparatus can be applied to the wireless terminal apparatus STA as long as it is capable of establishing a wireless channel with the wireless base station AP and performing wireless communication.

Although FIG. 4 shows an example of the system configuration in which the wireless base station AP shown in FIG. 2 is connected to the intra-company network NW, it is also possible to construct a system so that the wireless base station AP shown in FIG. 2 is connected to the Internet or another external network.

<Explanation of Operation of Wireless Base Station AP>

Now, a process of the wireless base station AP will be described with reference to FIG. 5.

First, the wireless base station AP performs a channel scan process to measure states of wireless channels in the vicinity of the wireless base station AP (step S100).

This makes is possible for the wireless base station AP to measure a received signal strength for each wireless channel.

Next, the wireless base station AP generates channel scan information 417 for each wireless channel on the basis of the received signal strength measured in the step S100 (step S110).

In this exemplary embodiment, channel scan information Sm of a wireless channel m is calculated by following Equation 1 by using a received signal strength prediction function f(x):

$$s_m = \sum_{n=1}^{N} R_n \times f(m - c_n)(m = 1, 2, \ldots M) \quad \text{[Equation 1]}$$

where, N denotes the total number of received signal strengths; Rn denotes a value of received signal strength; f(x) denotes a received signal strength prediction function; m denotes a range of a wireless channel; and Cn denotes a wireless channel number.

Figure 6:
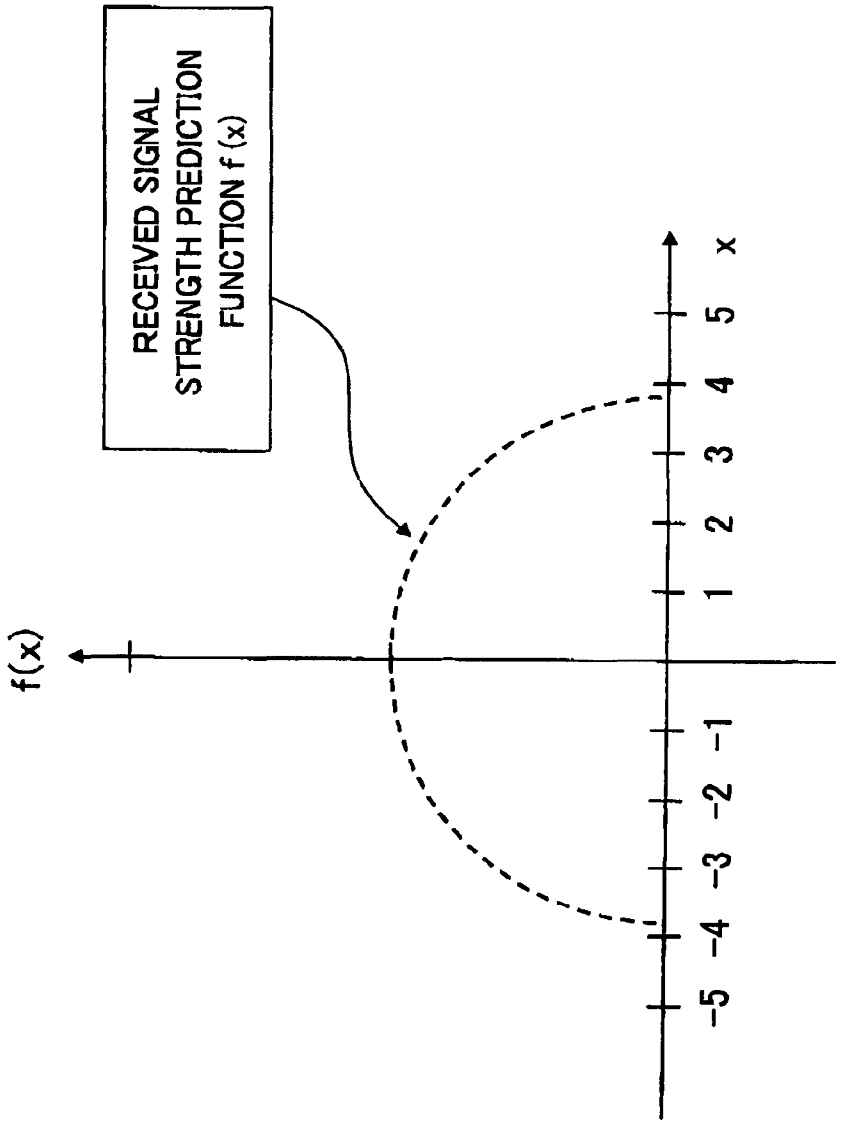
FIG. 6 is a diagram illustrating a received signal strength prediction function f(x)

The received signal strength prediction function f(x) is, for example, a quadratic function as shown in FIG. 6. Applicable examples of the received signal strength prediction function include a function obtained from a spread spectrum of frequency distribution, etc. and a function in consideration of a wave attenuation rate.

In addition, ranges of wireless channels m are different depending on wireless methods or countries. For example, in IEEE802.11b in U.S., a maximum range M of a wireless channel number is 11. Since the maximum range M of the wireless channel number is different depending on the wireless method of a country, the range of the wireless channel m can be arbitrarily set or changed.

Since the received signal strength prediction function f(x) assumes a wave transmission spectrum, it becomes a function having x=0 that is a central frequency as a maximum value, as shown in FIG. 6.

In practice, a series of wireless signals received from the wireless base stations APs are used to perform an analysis process that will be described later so as to obtain a power spectrum density P(f), and a function f(x) that uses the obtained power spectrum density P(f) as a peak value becomes the received signal strength prediction function f(x).

The analysis process can directly perform Fourier transformation on the series of wireless signals received from the wireless base stations APs to obtain the power spectrum density P(f).

For example, a case where a power spectrum density of a certain time waveform x(t) is P(f) means to provide a power Pt for a frequency component of an arbitrary infinitesimal interval (f, f+df), and Equation 2 is obtained:

$$Pt \equiv \frac{1}{|t_2 - t_1|}\int_0^\infty |x(t)|^2\,dt = \int_0^\infty P(f)\,df \qquad \text{[Equation 2]}$$

where, t2 and t2 denote arbitrary times, and a definition of P(f) is represented by Equation 4.

$$P(f) \equiv \lim_{|t_2 - t_1| \to \infty} \frac{1}{|t_2 - t_1|}\left|\int_{t_1}^{t_2} x(t)\exp(-j2\pi ft)\,dt\right|^2, \quad f \geq 0 \qquad \text{[Equation 3]}$$

Since the aforementioned analysis process is difficult by using only existing information, a pseudo function f(x) is preferably calculated from a typical spectrum.

For example, in a case of IEEE802.11b/g, a function f(x) that represents a spectrum or spectrum mask disclosed in Non-Patent Document 1 is preferably used.

In IEEE802.11a, similarly, a function f(x) that represents a spectrum disclosed in Non-Patent Document 1 is preferably used.

In a case of IEEE802.11b/g, Equation 4 is preferably applied as a pseudo function f(x) that represents the aforementioned spectrum.

$$f(x) = \frac{\sin(\pi \times x)}{\pi \times x}, \quad x \neq 0 \qquad \text{[Equation 4]}$$
$$f(x) = 1, \quad x = 0$$

Also, Equation 5 is preferably applied as a pseudo function f(x) that represents the aforementioned spectrum mask.

Accordingly, a process can be simplified as compared with a case where the function f(x) represented in Equation 4 is applied.

$$f(x)=10^{-5},\ x<2 \qquad \text{[Equation 5]}$$
$$f(x)10^{-3},\ 1<x\leqq 2$$
$$f(x)=1,\ -1\leqq x\leqq 1$$
$$f(x)=10^{-3},\ -2\leqq x<-1$$
$$f(x)=10^{-5},\ x<-2$$

Figure 7:
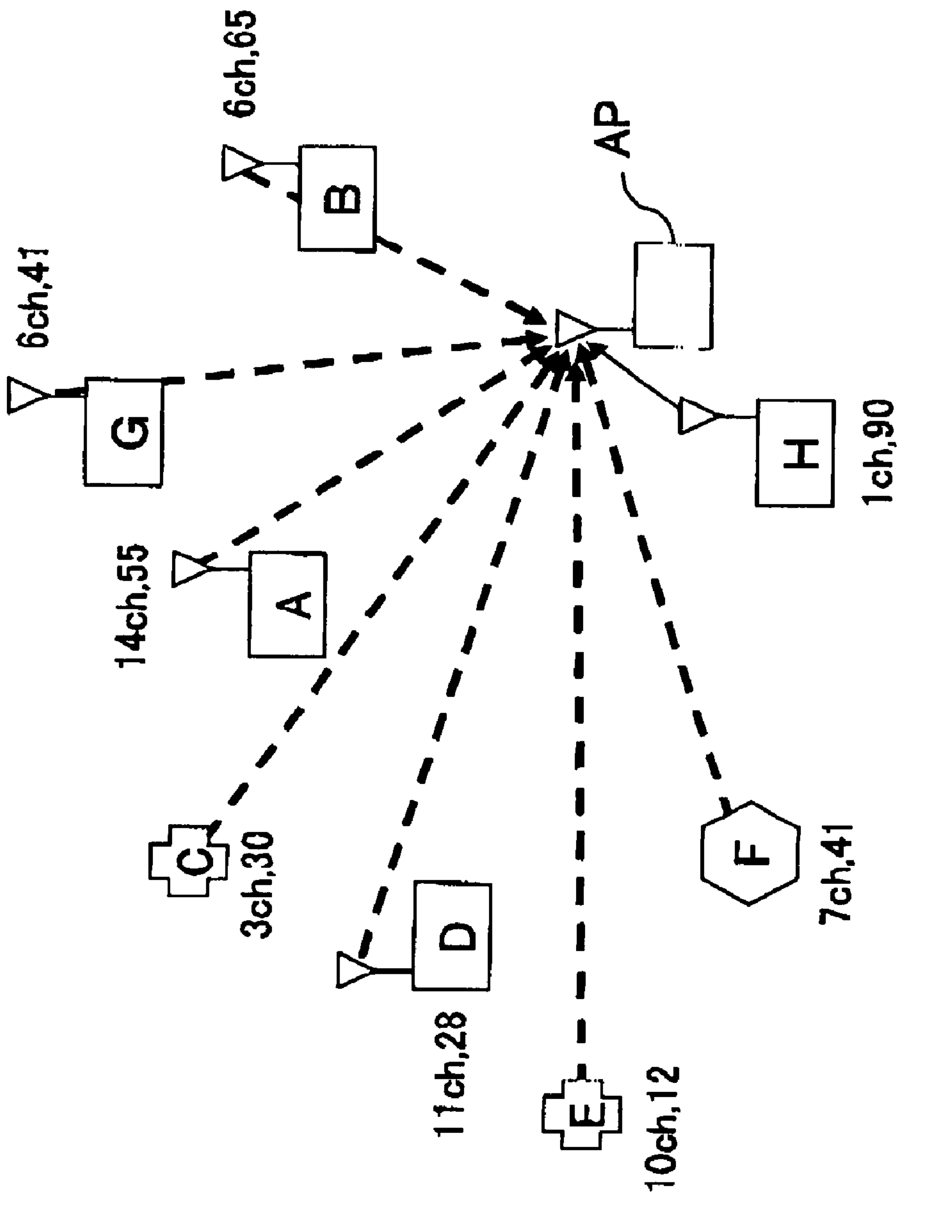
FIG. 7 is a diagram illustrating an example of wireless apparatuses which are wireless sources existing in the vicinity of the wireless base station AP.

As shown in FIG. 7 it is assumed that there are wireless apparatuses, which are wireless sources, in the vicinity of the wireless base station AP.

Figure 8:
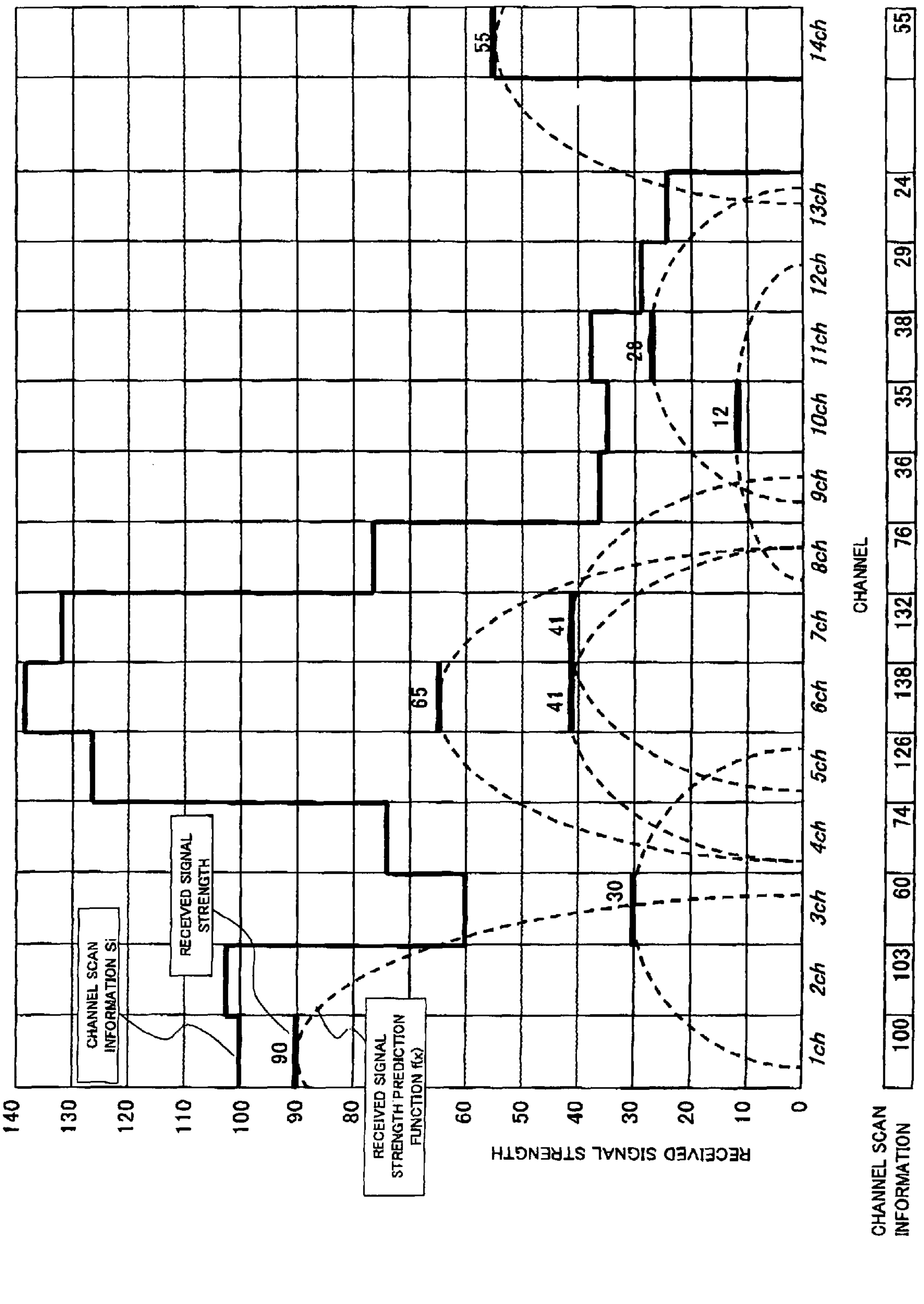
FIG. 8 is a diagram illustrating a measurement result in a case where the wireless base station AP performs a channel scan process under the environmental condition shown in FIG. 7 to measure a state of a wireless channel existing in the vicinity of the wireless base station AP for each wireless channel.

When the wireless base station AP performs the channel scan process to measure states of the wireless channels in the vicinity of the wireless base station AP, under the environmental conditions shown in FIG. 7, a measurement result shown in FIG. 8 is obtained.

The wireless base station AP performs the channel scan process to measure a received signal strength for each wireless channel which ranges from x=1 to x=14 to obtain the measurement result shown in FIG. 8.

In FIG. 8, it is represented that there exists a wireless apparatus H which uses a wireless channel 1ch and a received signal strength thereof is 90.

Similarly, it is represented that a wireless apparatus C which uses a wireless channel 3ch exists and a received signal strength thereof is 30.

It is represented that a wireless apparatus G which uses a wireless channel 6ch exists and a received signal strength thereof is 41.

It is also represented that there exists a wireless apparatus B which uses a wireless channel 6ch and a received signal strength thereof is 65.

Further, it is represented that there exists a wireless apparatus F which uses a wireless channel 7ch and a received signal strength thereof is 41.

Furthermore, it is represented that there exists a wireless apparatus E which uses a wireless channel 10ch and a received signal strength thereof is 12.

Moreover, it is represented that there exists a wireless apparatus D which uses a wireless channel 11ch and a received signal strength thereof is 28.

In addition, it is represented that there exists a wireless apparatus A which uses a wireless channel 14ch, and a received signal strength thereof is 55.

The aforementioned received signal strength can be measured by applying a known channel scan technique.

For example, it is possible to measure a received signal strength by using a scan method disclosed in Non-Patent Document 1. An active or passive scan method is available.

The active scan scheme retrieves a network by exchanging a probe request/response frame.

The passive scan scheme retrieves a network by a monitoring beacon.

A dotted line shown in FIG. 8 represents a calculation result of the received signal strength prediction function f(x) by the aforementioned Equation 1. For example, it is represented that when the wireless channel 1ch is used, the channel interference also occurs to the extent of the wireless channels 2ch and 3ch.

That is, the interference area according to the received signal strength 90 of the wireless channel 1ch ranges to the wireless channel 3ch.

The wireless base station AP calculates the received signal strength prediction function f(x) on the basis of the received signal strength measured by using the known channel scan method and predicts the interference area of the wireless channel in which the channel interference occurs (will occur) for each wireless channel.

Accordingly, without mounting a specific interference measurement apparatus on the wireless base station AP, it is possible to calculate the received signal strength prediction function f(x) on the basis of information on the existing received signal strength measured by using the known channel scan method and to predict the interference area of the wireless channel in which the channel interference occurs (will occur) for each wireless channel.

Although values of the received signal strength are applied in FIG. 8, logarithmic values thereof can be applied.

The wireless base station AP performs the channel scan process, and scans all the wireless channels to measure the received signal strength for each wireless channel (step S100).

Then, the wireless base station AP sequentially performs a calculation process of the channel scan information Si for all the wireless channels on the basis of the measured received signal strength and the received signal strength prediction function f(x) of the aforementioned Equation 1.

Consequently, the wireless base station AP calculates the channel scan information Si for each wireless channel shown in FIG. 8 and generates the channel scan information 417 for each wireless channel shown in FIG. 8 (step S110).

The channel scan information for each wireless channel is an interference-avoidance received signal strength needed for avoiding channel interference. As shown in FIG. 8, the channel scan information is the received signal strength including the received signal strength for each wireless channel and the interference area (the received signal strength prediction function f(x)) of each wireless channel.

The wireless base station AP manages the channel scan information 417 for each wireless channel generated through the aforementioned process in the storage unit 400.

For example, in case of the measurement result shown in FIG. 8, the channel scan information 417 which ranges from 1ch to 14ch is managed in the storage unit 400.

Next, the wireless base station AP performs channel allocation of the wireless interface 110 based on the channel scan information 417 stored in the storage unit 400 (step S120).

In this case, the wireless base station AP searches the channel scan information 417 which ranges from 1ch to 14ch for a wireless channel of which the channel scan information 417 is minimized and performs the channel allocation of the wireless interface 110.

For example, in case of the measurement result shown in FIG. 8, a value of the channel scan information of the wireless channel 13ch is minimized to 24, and thus, the wireless base station AP allocates the wireless channel 13ch to the wireless interface 110.

When there are a plurality of wireless channels of which channel scan information is minimized, an optimal channel among the plurality of wireless channels is allocated in consideration of the channel scan information of both neighboring wireless channels.

For example, it is assumed that a value of the channel scan information of the wireless channel 3ch is 30, a value of the channel scan information of the wireless channel 12ch is 30, and the channel scan information of the wireless channels 3ch and 12ch have the same value.

It is also assumed that values of the channel scan information of the neighboring wireless channels 2ch and 4ch of the wireless channel 3ch are 100 and 75, respectively.

In addition, it is assumed that values of the channel scan information of the neighboring wireless channels 11ch and 13ch of the wireless channel 12ch are 40 and 35, respectively.

In this case, the channel scan information of both neighboring wireless channels 2ch and 4ch of the wireless channel 3ch is compared with the channel scan information of both neighboring wireless channels 11ch and 13ch of the wireless channel 12ch. Since the value of the channel scan information of the neighboring wireless channels of the wireless channel 12ch is less than that of the neighboring wireless channels of the wireless channel 3ch, the wireless channel 12ch is allocated to the wireless interface 110.

Accordingly, it is possible to allocate an optimal wireless channel to the wireless interface 110 in consideration of the channel scan information of both neighboring wireless channels.

In the aforementioned example, an optimal wireless channel is allocated to the wireless interface 110 in consideration of each of the neighboring wireless channels. It is also possible to allocate an optimal wireless channel to the wireless interface 110 in consideration of each of two or three neighboring wireless channels on both sides of the wireless channel, the wireless channels being presumed to generate channel interference.

In this exemplary embodiment, it is possible to construct the wireless base station AP so that the wireless base station AP retrieves the channel scan information 417 not for a wireless channel of which the channel scan information 417 is minimized but for a wireless channel of which the channel scan information 417 is less than a predetermined threshold.

In this case, the predetermined threshold can be arbitrarily set and changed.

When there are a plurality of wireless channels of which channel scan information is less than the predetermined threshold, like above, it is possible to construct the wireless base station AP so that an optimal wireless channel among the plurality of wireless channels is allocated in consideration of channel scan information of both neighboring wireless channels or so that a wireless channel of which the channel scan information 417 is minimized, is allocated.

As described above, the wireless base station AP measures a received signal strength for each wireless channel and predicts an interference area of a wireless channel in which channel interference occurs (will occur) on the basis of the measured received signal strength for each wireless channel and the received signal strength prediction function f(x) of the aforementioned Equation 1.

The wireless base station AP selects a wireless channel in which channel interference does not occur on the basis of the received signal strength measured for each wireless channel and an interference area predicted for each wireless channel and allocates the selected wireless channel to the wireless interface 110 as a new wireless channel to be used for wireless communication.

This enables the wireless base station AP to automatically allocate a wireless channel of which an occurrence rate of channel interference is low, to the wireless interface 110. Consequently, it is possible to avoid a conflict with another wireless apparatus or occurrence of channel interference, thereby improving communication performance.

The wireless base station AP measures a received signal strength for each wireless channel and predicts an interference area of a wireless channel in which channel interference occurs on the basis of the measured received signal strength for each wireless channel and the received signal strength prediction function f(x) of the aforementioned Equation 1.

This makes it possible to predict the interference area of the wireless channel in which the channel interference occurs for each wireless channel by using information on a received signal strength for each existing wireless channel.

Thus, it is possible to automatically allocate a wireless channel of which occurrence rate of channel interference is low to the wireless interface 110, without mounting a specific interference measurement apparatus on the wireless base station AP.

Figure 5:
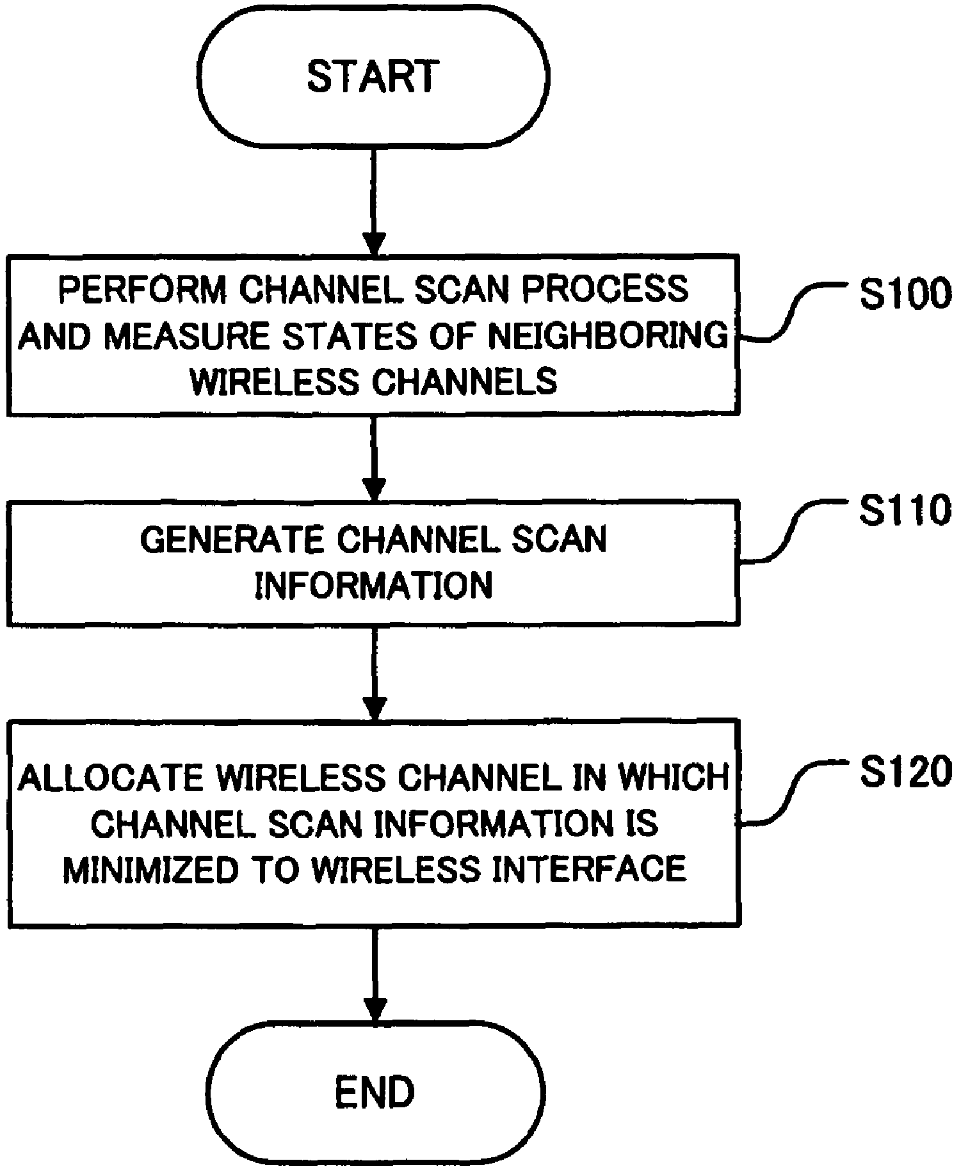
FIG. 5 is a flowchart illustrating a series of processes performed by the wireless base station AP.

Although a single wireless base station AP has been considered, it is possible to allocate an optimal channel by performing the aforementioned series of processes shown in FIG. 5 even if there is a plurality of wireless base stations APs.

For example, assume that there are a plurality of wireless base stations APs. In this case, an apparatus such as a wireless LAN control unit which intensively controls a plurality of wireless base stations APs makes a channel allocation instruction for each wireless base station AP in a centralized manner, and causes each wireless base station AP to execute the aforementioned series of processes shown in FIG. 5. Accordingly, it is possible to control the wireless base stations APs so that an optimal wireless channel is allocated.

It is also possible to control the wireless base stations APs so that each wireless base station AP adjusts a time for allocating a wireless channel and performs the series of processes shown in FIG. 5 in an autonomous distributed manner to allocate an optimal wireless channel.

Although an "infrastructure mode" between the wireless base station AP and the wireless interface 110 has been explained, it is also possible to perform a channel allocation for the wireless interface 110 in an "ad-hoc mode." The connection type (mode) of the wireless interface is not limited, and the technical idea can be applied to all the connection types.

Second Exemplary Embodiment

Now, a second embodiment of the present invention will be described.

Figure 1:
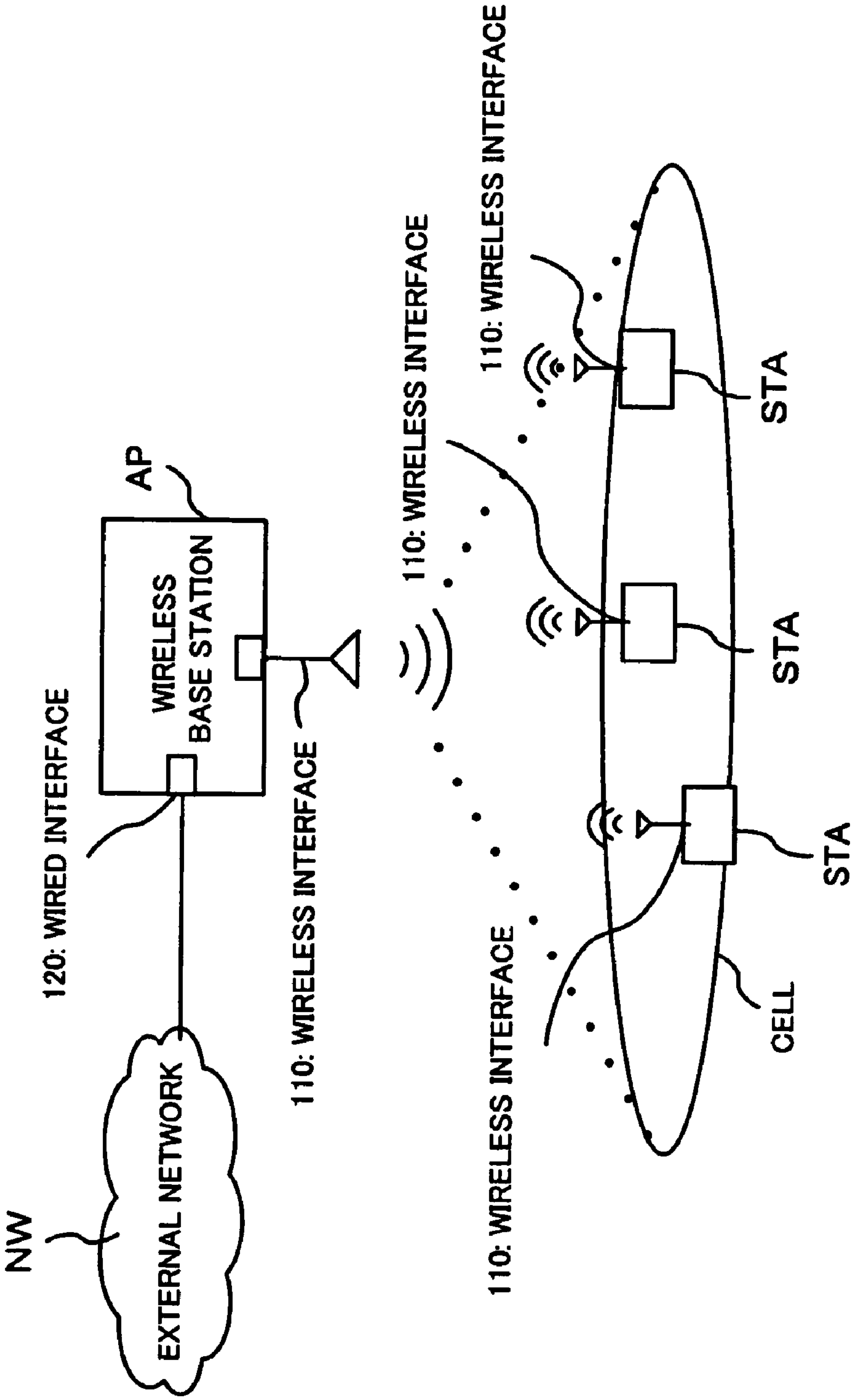
FIG. 1 is a diagram illustrating a configuration of a wireless communication system.

In the first exemplary embodiment, the wireless base station AP shown in FIG. 1 performs the series of processes shown in FIG. 5, selects a wireless channel in which channel interference does not occur on the basis of a received signal strength measured for each wireless channel and an interference area predicted for each wireless channel, and allocates the selected wireless channel as a wireless channel to be used for wireless communication.

In the second exemplary embodiment of the present invention, the wireless terminal apparatus STA shown in FIG. 1 selects a wireless base station AP in which channel interference does not occur on the basis of a received signal strength measured for each wireless channel and an interference channel predicted for each wireless channel, and accesses the selected wireless base station AP.

This configuration enables the wireless terminal apparatus STA to be connected to a wireless base station in which channel interference dose not occur or channel interference is low.

Hereinafter, the second exemplary embodiment of the present invention will be described with reference to FIGS. 9 to 16.

<System Configuration of Wireless Communication System>

First, a system configuration of a wireless communication system will be described with reference to FIG. 9.

The wireless communication system includes a plurality of wireless base stations APs, a plurality of wired terminal apparatuses 101, and a plurality of wireless terminal apparatuses STAs.

The wireless base stations APs and the wired terminal apparatuses 101 have the same function as in the first exemplary embodiment.

Figure 9:
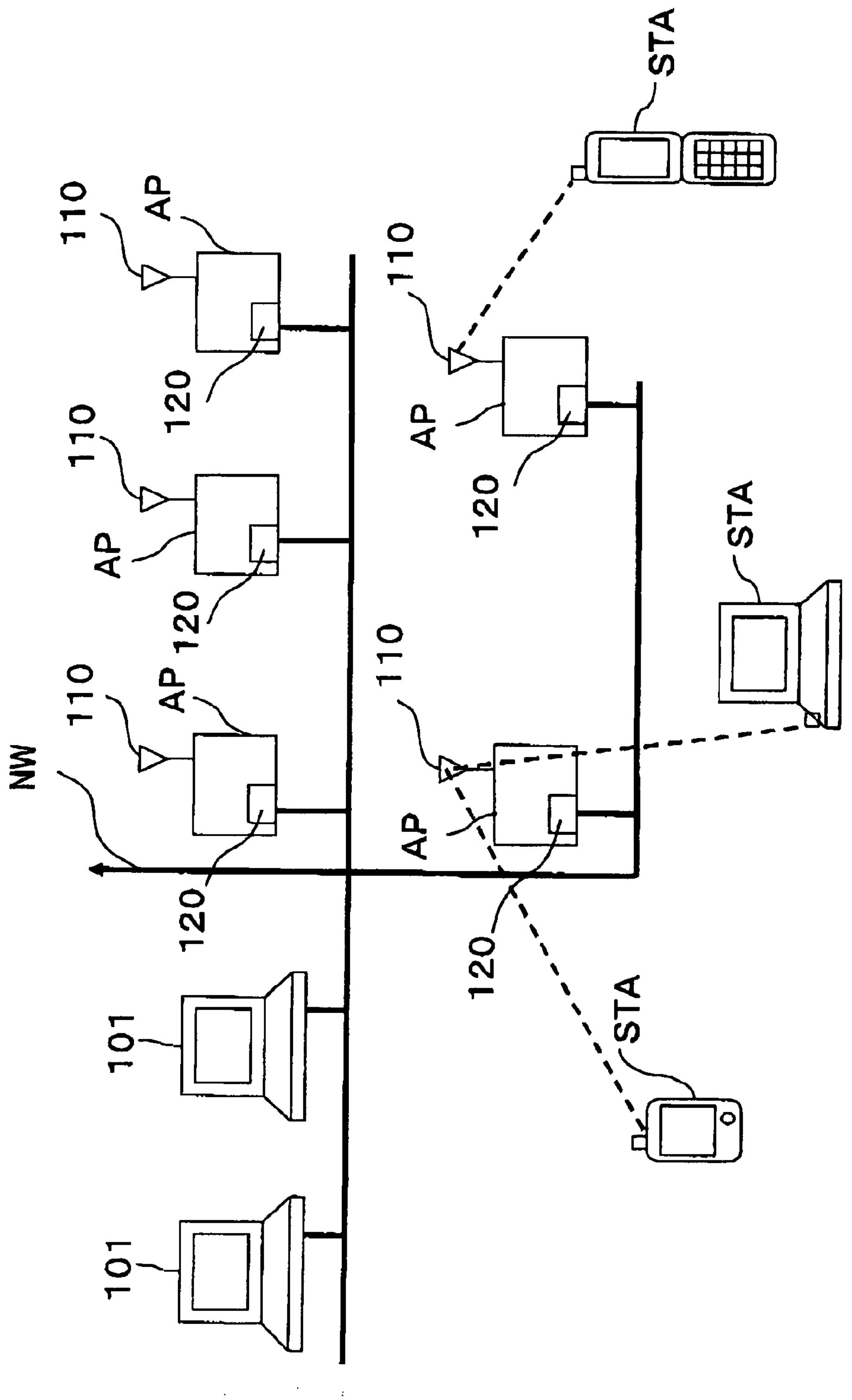
FIG. 9 is a diagram illustrating a configuration of a wireless communication system according to a second exemplary embodiment of the present invention.

Five wireless base stations APs shown in FIG. 9 are connected to the same intra-company network NW through wired interfaces 120 in a wired manner.

Thus, to construct the system of the same sub-net, the same extended service set identifiers (ESSIDs) are set in the five wireless base stations APs shown in FIG. 9.

It is possible to distinguish the wireless base stations APs from wireless apparatuses (wireless base stations APs or wireless terminal apparatuses STA) in a system of another subnet system by using the same ESSIDs.

<Internal configuration of Wireless Terminal Apparatus STA>

Next, an internal configuration of a wireless terminal apparatus STA will be described with reference to FIG. 10.

Figure 10:
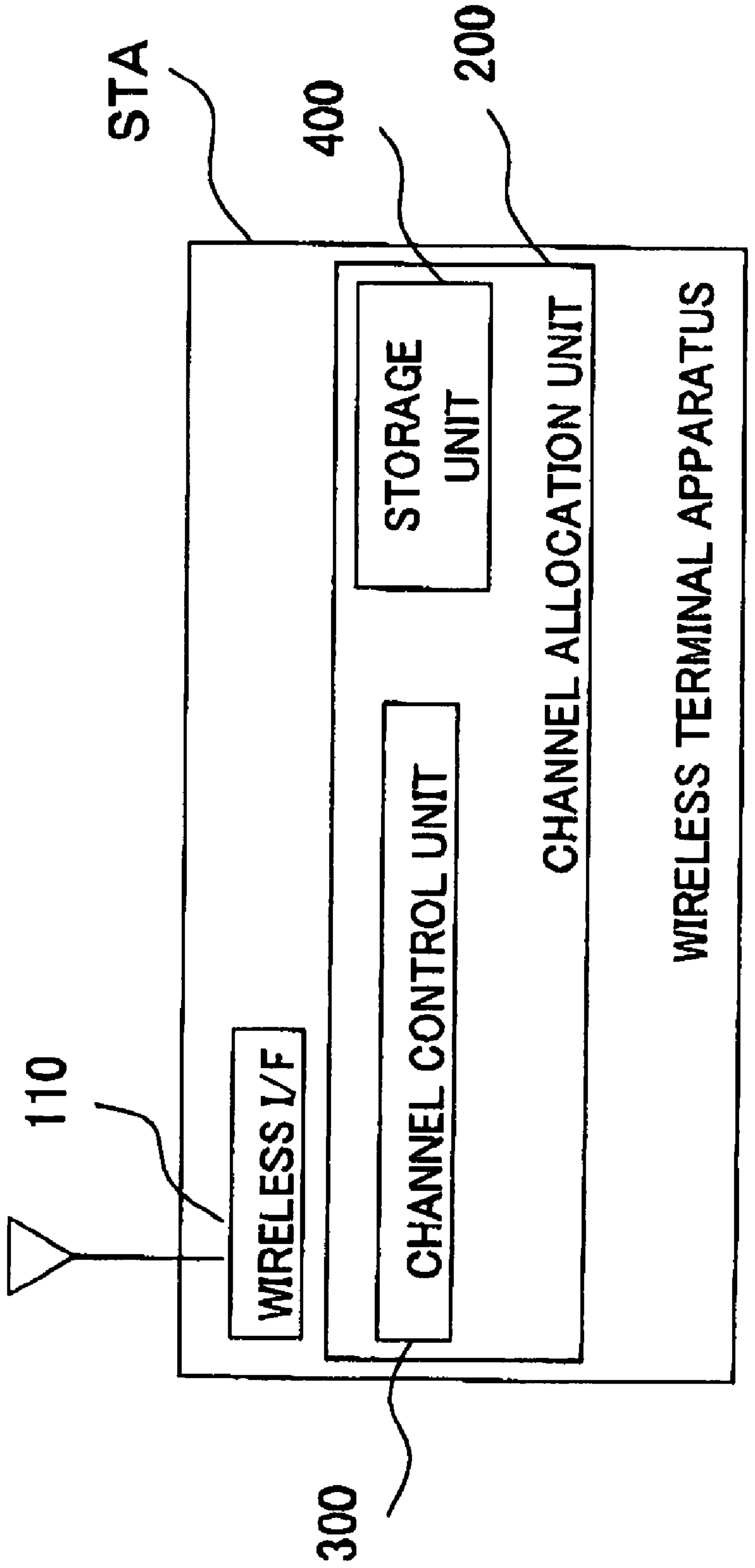
FIG. 10 is a diagram illustrating an internal configuration of a wireless terminal apparatus STA that constitutes the wireless communication system.

As shown in FIG. 10, the wireless terminal apparatus STA includes a wireless interface 110 and a channel allocation unit 200.

Although the wireless terminal apparatus STA shown in FIG. 10 is constructed so that not a wired interface 120 but a wireless interface 110 is mounted on the wireless terminal apparatus STA, the existence of the wired interface 120 or the number of the wireless interfaces 110 is not limited.

The channel allocation unit 200 allocates a wireless channel.

The channel allocation unit 200 includes a channel control unit 300 and a storage unit 400.

The channel control unit 300 is designed to allocate a wireless channel suitable for the wireless interface 110 on the basis of information stored in the storage unit 400.

The storage unit 400 is designed to store information for allocating a wireless channel to the wireless interface 110.

Figure 11:
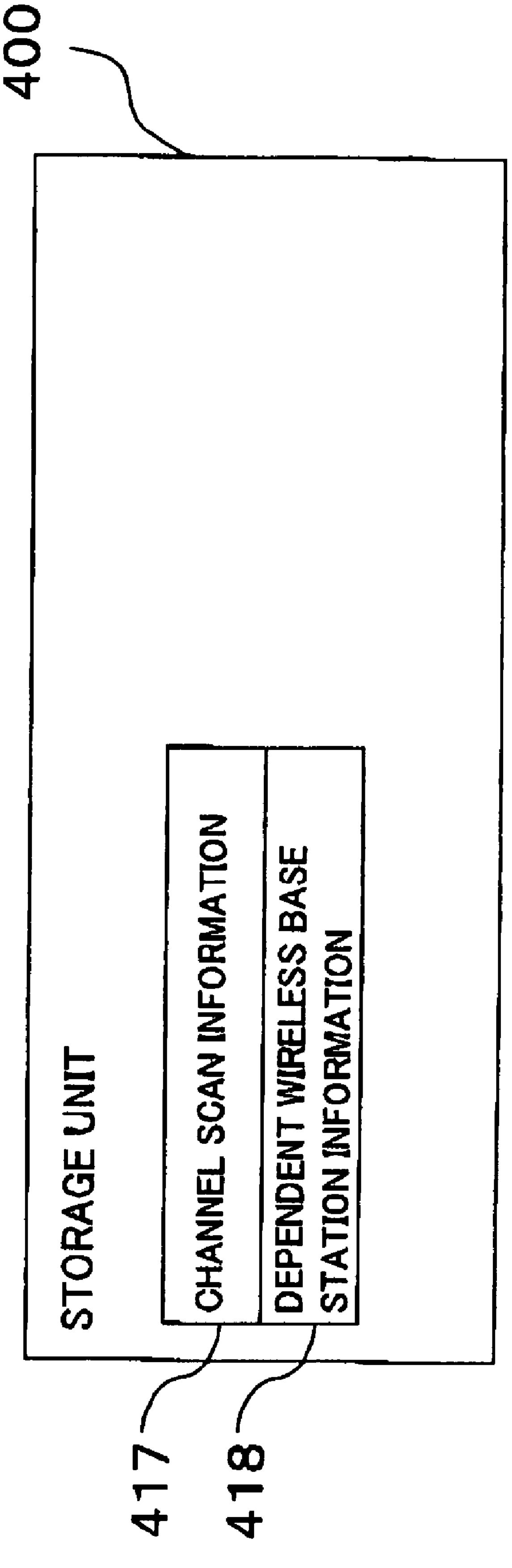
FIG. 11 is a diagram illustrating an internal configuration of a storage unit of a wireless terminal apparatus STA that constitutes the wireless communication system.

As shown in FIG. 11, the storage unit 400 stores channel scan information 417 and dependent wireless base station information 418.

The channel scan information 417 is used to manage a received signal strength for each wireless channel available for the wireless terminal apparatus STA.

The channel scan information 417 is generated based on a usage state of wireless channels used by wireless apparatuses (for example, another wireless terminal apparatus STA or wireless base station AP) existing in the vicinity of the wireless terminal apparatus STA.

The dependent wireless base station information 418 is information on a wireless base station AP to which the wireless terminal apparatus STA roams.

As shown in FIG. 12, the dependent wireless base station information 418 includes "connection information", "wireless channel", and "interference information".

The "connection information" is used when the wireless terminal apparatus STA accesses the wireless base station AP. Examples of the connection information include a service identifier such as a service set identifier (SSID), an extended service set identifier (ESSID), and a basic service set identifier (BSSID).

The "wireless channel" is used when the wireless terminal apparatus STA accesses the wireless base station AP. The wireless channel may be used to select an optimal wireless base station AP for communication in which channel interference is low.

The "interference information" represents an occurrence rate of channel interference.

In this exemplary embodiment, as the value of the interference information becomes large, the channel interference increases.

<Explanation of Operation of Wireless Terminal Apparatus STA>

Now, a series of processes of a wireless terminal apparatus will be described with reference to FIG. 13.

First, the wireless terminal apparatus STA performs a channel scan process to measure states of wireless channels existing in the vicinity of the wireless terminal apparatus STA (step S200).

This allows the wireless terminal apparatus STA to measure a received signal strength for each wireless channel.

Since a roaming process is expected, an active scan method is preferably applied.

When the active scan method is used, there is a probability that current communication is disconnected since a wireless channel is switched.

Therefore, a passive scan method is used in the roaming process after the active scan method is applied. It is preferable to use information gathered by applying the passive scan method during communication.

The channel scan processing method is not limited thereto. All the known channel scan methods can be applicable.

Next, the wireless terminal apparatus STA generates channel scan information 417 for each wireless channel on the basis of the received signal strength measured in the step S200 (step S210).

Figure 14:
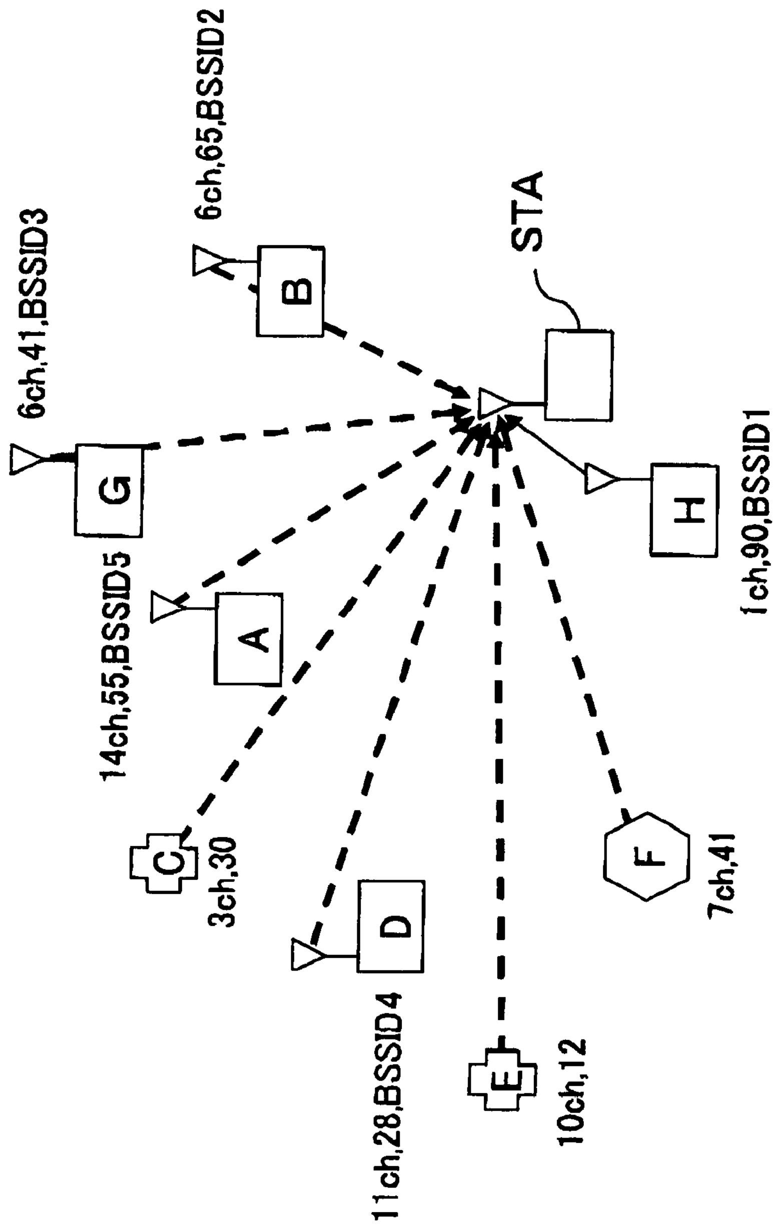
FIG. 14 is a diagram illustrating an example of wireless apparatuses which are wireless sources existing in the vicinity of the wireless base station AP.

For example, it is assumed that, as shown in FIG. 14, a wireless apparatus which becomes a wireless source exists in the vicinity of the wireless terminal apparatus STA.

Figure 15:
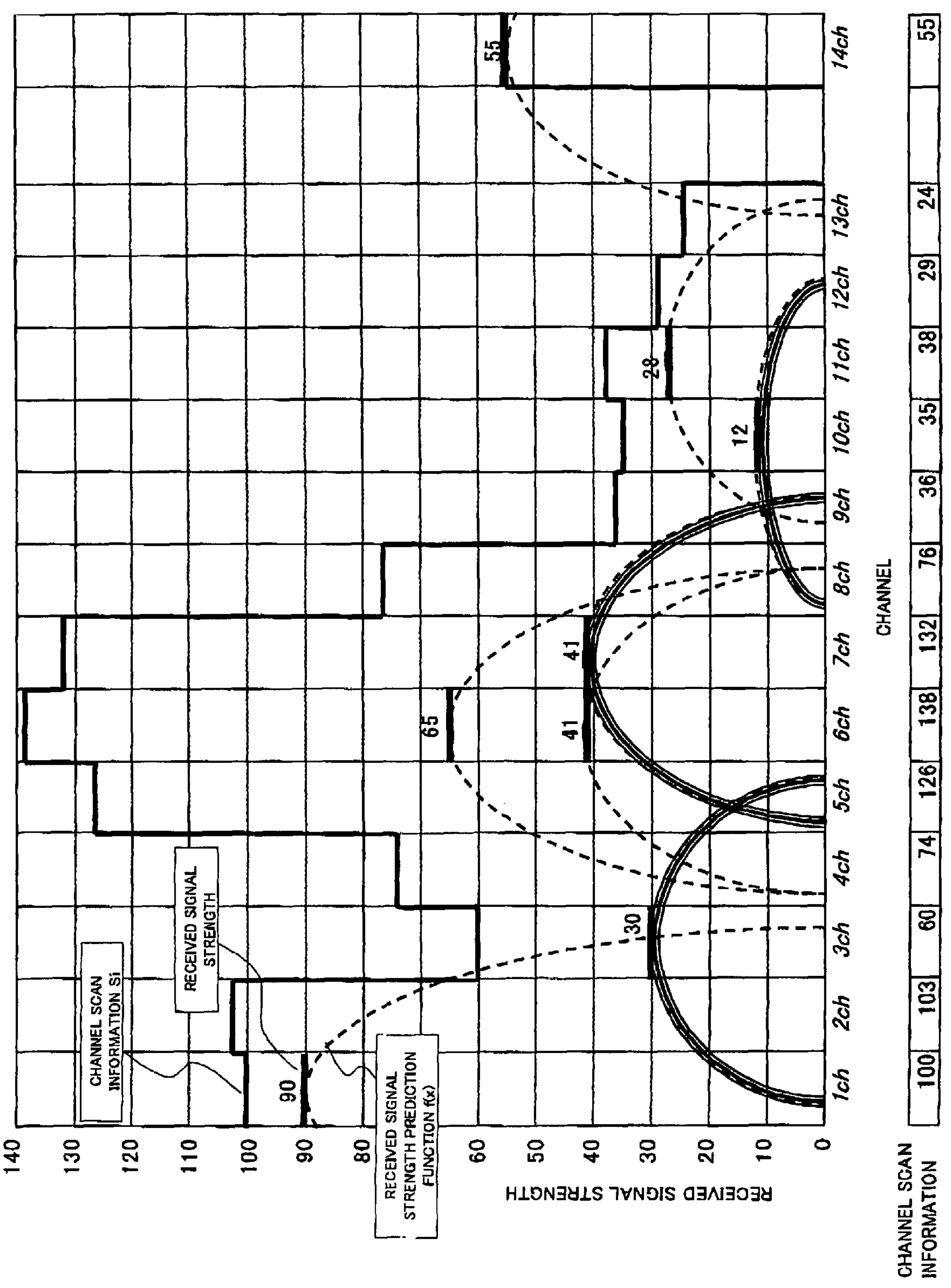
FIG. 15 is a diagram illustrating a measurement result in a case where the wireless terminal apparatus STA performs a channel scan process under the environmental condition shown in FIG. 14 to measure a state of a wireless channel existing in the vicinity of the wireless terminal apparatus STA for each wireless channel.

When the wireless terminal apparatus STA performs the channel scan process to measure states of the wireless channels in the vicinity of the wireless terminal apparatus STA under the environmental conditions shown in FIG. 14, a measurement result shown in FIG. 15 is obtained.

The wireless terminal apparatus STA performs the channel scan process and measures a received signal strength for each wireless channel which ranges from x=1 to x=14 to obtain the measurement result shown in FIG. 15.

A "dotted line" and a "double line" shown in FIG. 15 represent a calculation result of the received signal strength prediction function f(x) of the aforementioned Equation 1. For example, when the wireless channel 1ch is used, channel interference occurs to the extent of wireless channels 2ch and 3ch.

The "dotted line" represents a wireless base station of the current system that constitutes the same subnet. The "double line" represents a wireless base station of another system that constitutes another subnet.

It is possible to determine whether a wireless base station belongs the current system ("dotted line") or another system ("double line") based on a service identifier such as an SSID or ESSID acquired from each wireless apparatus by the channel scan process.

Since the same ESSID is set in the wireless base station AP of the current system, another ESSID is set in the wireless base station AP of another system in order to distinguish the wireless base stations APs of the current system from the wireless base stations APs of another system.

Different BSSIDs are set in the wireless base stations APs to distinguish wireless base stations APs of the current system from one another.

For example, a BSSID corresponds to a MAC address of the wireless interface 110.

Accordingly, the current system is distinguished from another system based on the ESSID. The wireless base stations APs in the current system are distinguished from one another based on the BSSID.

The wireless terminal apparatus STA performs the channel scan process, and scans all the wireless channels to measure the received signal strength for each wireless channel (step S200).

Next, a calculation process of the channel scan information Si is sequentially performed for all the wireless channels on the basis of the measured received signal strength and the received signal strength prediction function f(x) of the aforementioned Equation 1.

As a consequence, the wireless terminal apparatus STA calculates the channel scan information Si for each wireless channel shown in FIG. 15 and generates the channel scan information 417 for each wireless channel shown in FIG. 15 (step S210).

In the wireless terminal apparatus STA, the channel scan information 417 for each wireless channel generated in the aforementioned process is managed in the storage unit 400.

For example, in case of the measurement result shown in FIG. 15, the channel scan information 417 which ranges from 1ch to 14ch is managed in the storage unit 400.

Next, the wireless terminal apparatus STA selects a wireless base station AP to which the wireless terminal apparatus STA roams on the basis of the channel scan information 417 stored in the storage unit 400 and the received wave strength for each wireless channel measured in the step S200.

First, the wireless terminal apparatus STA specifies a wireless base station AP in which a received signal strength is equal to or greater than a threshold R among the wireless base stations APs of the current system that constitutes the same subnet, and calculates interference information C of the specified wireless base station AP (step S220).

Assuming that the wireless channel of the wireless base station AP in which a received signal strength is equal to or greater than the threshold R is j, the interference information C of the wireless base station AP is calculated by the following Equation 6:

$$C=S_j-r \qquad \text{[Equation 6]}$$

where, $S_j$ indicates channel scan information (channel scan information shown in FIG. 15) of the wireless channel j; and r indicates the received signal strength (received signal strength shown in FIG. 15) of the wireless base station AP of the wireless channel j.

Next, when the interference information C is not stored in the storage unit 400 or when the interference information calculated in the step S220 is equal to or less than the interference information stored in the storage unit 400 (step S230/Yes), the wireless terminal apparatus STA stores the interference information C calculated in the step S220, connection information such as an ESSID used for belonging to the wireless base station, and the wireless channel in the storage unit 400 as the dependent wireless base station information 418 (step 240).

On the other hand, when the interference information C calculated in the step S220 is greater than the interference information stored in the storage unit 400 (step S230/No), the wireless terminal apparatus STA does not store information such as the interference information C calculated in the step S220 in the storage unit 400 as the dependent wireless base station information 418, and proceeds to the next process.

Next, the wireless terminal apparatus STA determines whether or not the calculation of the interference information C is completed on all the wireless base stations APs in the current system that constitutes the same subnet (step S250). When it is determined that the calculation of the interference information C is not completed on all the wireless base stations APs in the current system (step S250/No), the wireless terminal apparatus STA proceeds to the step S220 and performs calculation of the interference information on all the wireless base stations APs that constitutes the current system.

Consequently, the wireless terminal apparatus STA stores in the storage unit 400 the dependent wireless base station information 418 on a wireless base station AP in which a received signal strength is equal to or greater than the threshold R and in which interference information C is the least among the wireless base stations APs of the current system.

Thus, the wireless terminal apparatus STA stores the dependent wireless base station information 418 shown in FIG. 12 in the storage unit 400.

Next, the wireless terminal apparatus STA sets in the wireless interface (110) the dependent wireless base station information 418 on a wireless base station AP in which channel interference does not occur on the basis of the dependent wireless base station information 418 shown in FIG. 12 which is stored in the storage unit 400 (step S260).

FIG. 16 illustrates a calculation result obtained by specifying a wireless base station AP of a current system and calculating interference information C of the specified wireless base station AP on the basis of the measurement result shown in FIG. 15.

In case of the calculation result shown in FIG. 16, it is represented that the received signal strength from a wireless apparatus H which uses the wireless channel 1ch is 90, the channel scan information is 100, the interference information C is 10, and the connection information is BSSID1.

Similarly, it is represented that the received signal strength from a wireless apparatus B which uses the wireless channel 6ch is 65, the channel scan information is 138, the interference information C is 73, and the connection information is BSSID2.

It is also represented that the received signal strength from a wireless apparatus G which uses the wireless channel 6ch is 41, the channel scan information is 138, the channel information C is 97, and the connection information is BSSID3.

Further, it is represented that the received signal strength from a wireless apparatus D which uses the wireless channel 11ch is 28, the channel scan information is 38, the interference information C is 10, and the connection information is BSSID4.

Furthermore, it is represented that the received signal strength from a wireless apparatus A which uses the wireless channel 14ch is 55, the channel scan information is 55, the interference information C is 0, and the connection information is BSSID5.

Figure 13:
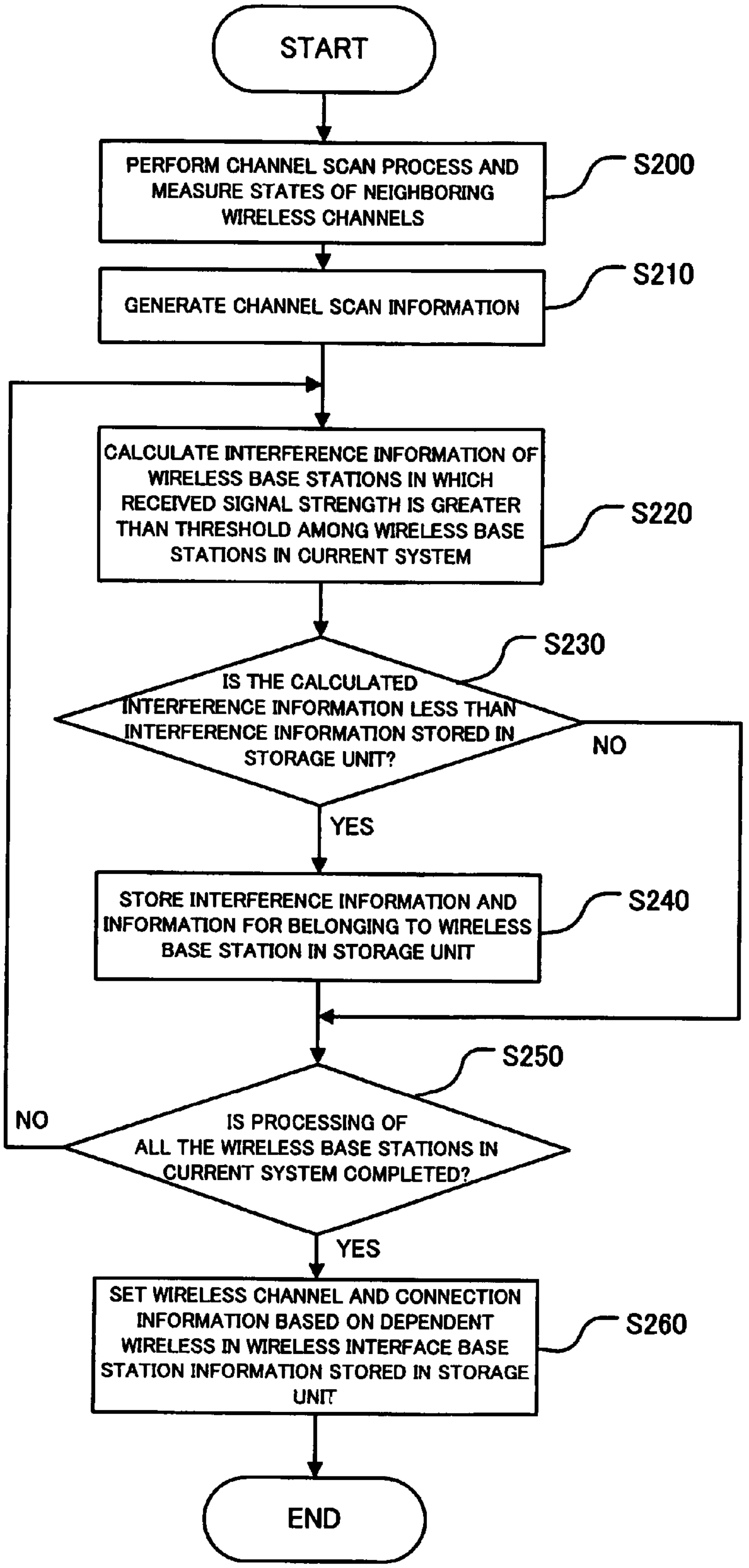
FIG. 13 is a flowchart illustrating a series of processes performed by the wireless terminal apparatus STA.

For example, assume that in the step S230 shown in FIG. 13, the threshold R of the received signal strength is set to 50, and the wireless base station AP, in which the received signal strength is equal to or greater than the threshold 50, is specified among the wireless base stations APs in the current system that constitutes the same subnet, on the basis of the measurement result shown in FIG. 15. In this case, corresponding wireless base stations are the wireless base stations with BSSID1, BSSID2, BSSID5 shown in FIG. 16.

Next, the wireless terminal apparatus STA calculates the interference information C of the wireless base stations with BSSID1, BSSID2, and BSSID5 shown in FIG. 16. The interference information C of the wireless base station with BSSID1 is 10. The interference information C of the wireless base station with BSSID2 is 73. The interference information C of the wireless base station with BSSID5 is 0.

Accordingly, through the processes in the steps S220 to S250 shown in FIG. 13, the wireless terminal apparatus STA finally stores the dependent wireless base station information 418 on the wireless base station with BSSID5 of which interference information C is minimized among the wireless base stations with BSSID1, BSSID2, and BSSID5. As a consequence, the wireless terminal apparatus STA sets the wireless channel 6ch and the connection information BSSID5 in the wireless interface 110 on the basis of the dependent wireless base station information 418 stored in the storage unit 400 (step S260).

When there are a plurality of wireless base stations of which interference information C is minimized, an optimal wireless base station is selected from among the plurality of wireless base stations in consideration of the received signal strength and the channel scan information of both neighboring wireless channels.

As described above, the wireless terminal apparatus STA selects a wireless base station AP in which an occurrence rate of the channel interference is minimized by selecting a wireless base station AP in which the received signal strength is equal to or greater than the threshold R and in which the interference information C is minimized. This makes it possible to roam to the selected wireless base station AP.

Since the dependent wireless base station information 418 on the wireless base station AP in which the "interference information" that is the occurrence rate of the channel interference is low is stored in the storage unit 400, it is possible to roam to the wireless base station AP in which the "interference information" that is the occurrence rate of the channel interference is low.

Also, this enables the wireless terminal apparatus STA to belong to a wireless base station of another wireless channel according to a change of the received signal strength of the wireless base station to which the wireless terminal apparatus STA currently belongs.

The wireless terminal apparatus STA stores the dependent wireless base station information 418 on the wireless base station with BSSID5 in which the interference information C is minimized in the storage unit 400 and sets in the wireless interface 110 the dependent wireless base station information 418 on the wireless base station AP with BSSID5 on the basis of the dependent wireless base station information 418 stored in the storage unit 400. Other various methods are also available as long as it is possible to set in the wireless interface 110 the dependent wireless base station information 418 on the wireless base station with BSSID5 in which the interference information C is minimized on the basis of the channel scan information 417 stored in the storage unit 400 and the received wave strength for each wireless channel measured in the step S200.

For example, it is possible to construct a wireless base station AP so that information shown in FIG. 16 is previously generated based on the channel scan information 417 stored in the storage unit 400 and the received wave strength for each wireless channel measured in the step S200 and that the dependent wireless base station information 418 on the wireless base station with BSSID5 in which the interference information C is minimized is set in the wireless interface 110.

Although the wireless base station AP in which the interference information C is minimized is selected, it is also possible to construct a wireless base station AP so as to select wireless base stations AP in which the values of the interference information C are less than a predetermined threshold.

Figure 17:
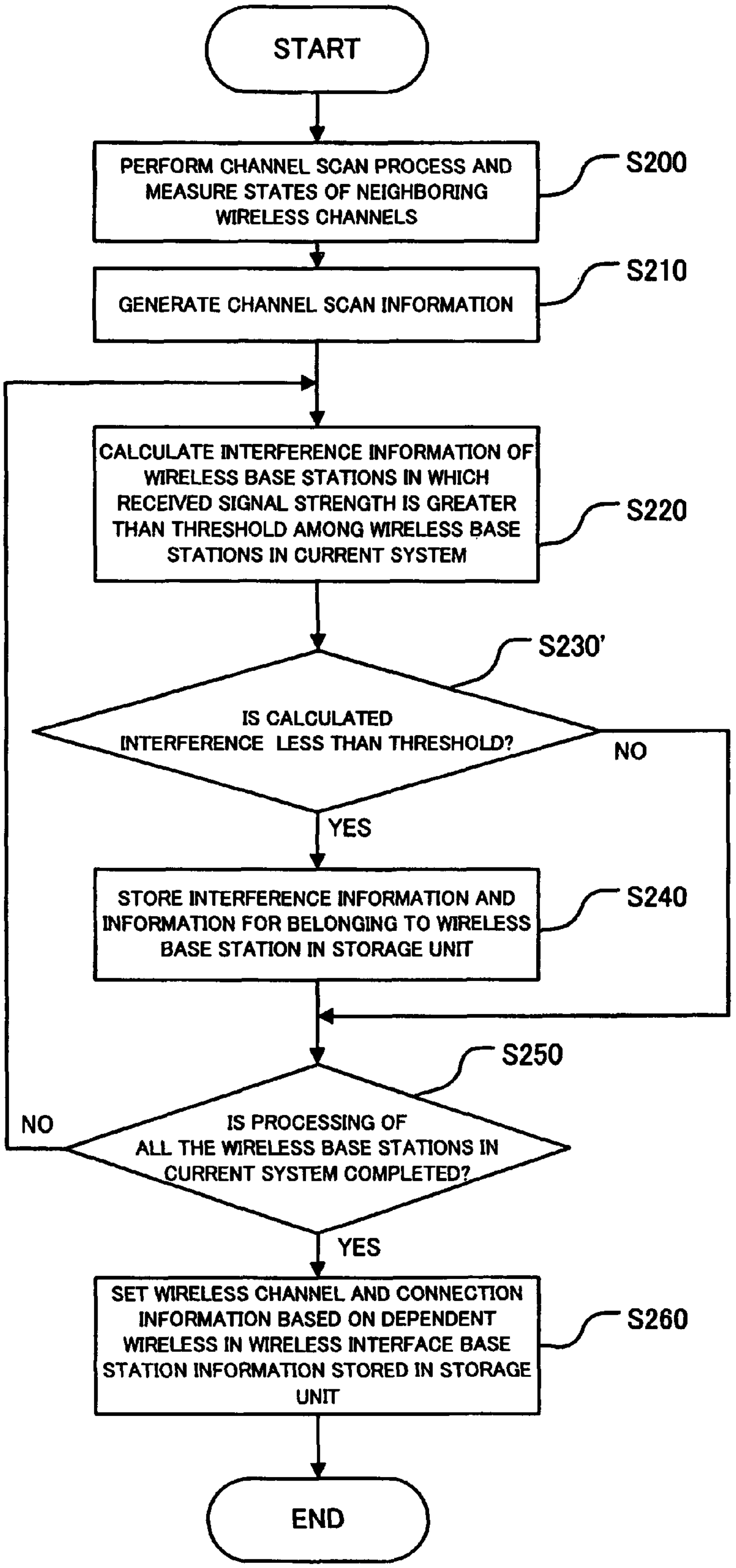
FIG. 17 is a flowchart illustrating a series of processes performed by the wireless terminal apparatus STA.

For example, assume that as shown in FIG. 17, the interference information C calculated in the step S220 is less than a predetermined threshold in the step S230 (step S230)/Yes). In this case, the wireless terminal apparatus STA stores the interference information C calculated in the step S220, the connection information such as an ESSID for belonging to the wireless base station, and the wireless channel in the storage unit 400 as the dependent wireless base station information 418 (step S240).

The wireless terminal apparatus STA is controlled so that the dependent wireless base station information 418 on the wireless base station AP in which the channel interference does not occur is set in the wireless interface 110 on the basis of the dependent wireless base station information 418 stored in the storage unit 400 in the step S240 (step S260).

In this way, the wireless terminal apparatus STA selects wireless base stations in which the values of the interference information C are less than the predetermined threshold is selected.

The predetermined threshold in the step S230 can be arbitrarily set and changed.

In addition, when there are a plurality of wireless base stations APs in which the interference information C is less than the predetermined threshold, it is possible to construct the wireless terminal apparatus STA so that an optimal wireless base station is selected from among the plurality of wireless base stations in consideration of the received signal strength and the channel scan information of both neighboring wireless channels adjacent to the wireless channel of the wireless base station AP or so that a wireless base station AP in which the channel scan information C is minimized, is selected.

Third Exemplary Embodiment

Now, a third exemplary embodiment of the present invention will be described.

Figure 18:
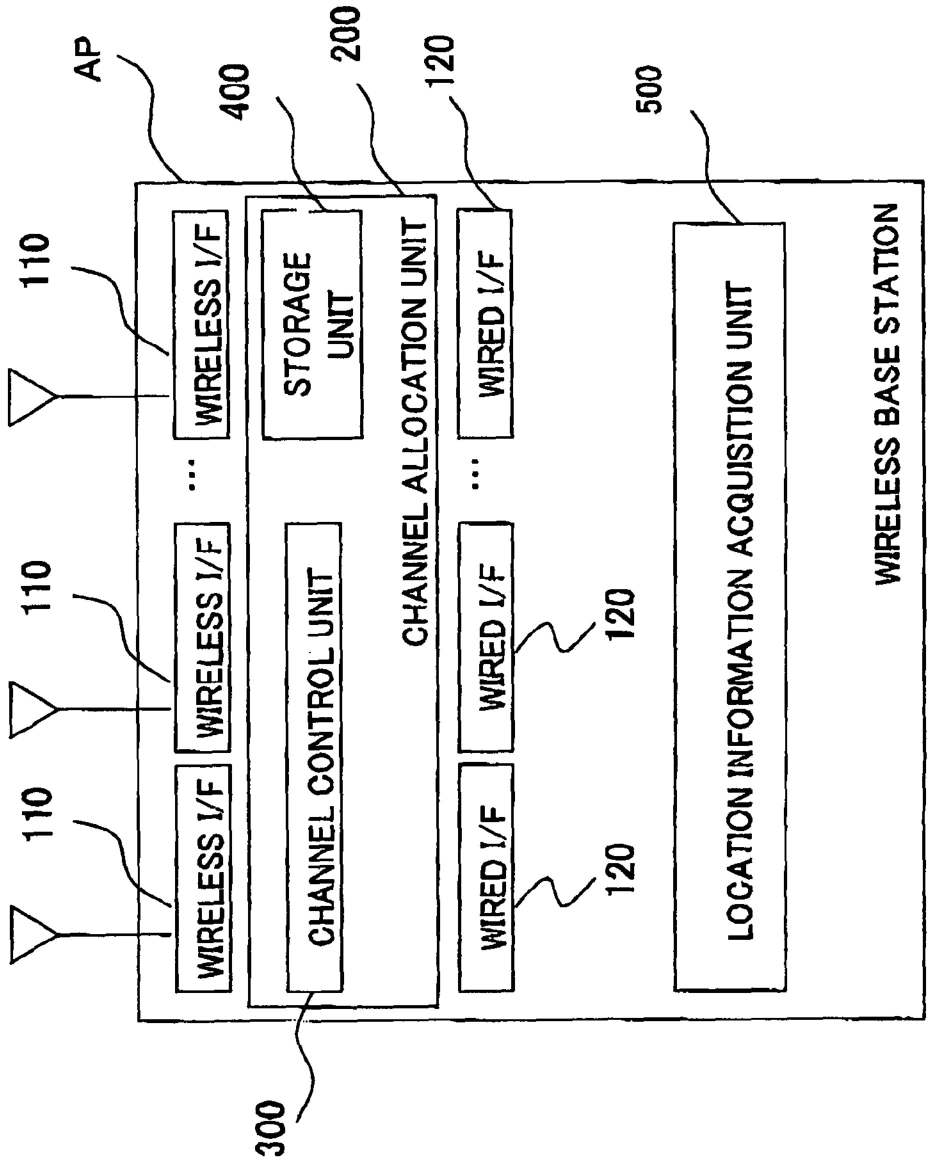
FIG. 18 is a diagram illustrating an internal configuration of a wireless base station AP that constitutes a wireless communication system according to a third embodiment of the present invention.

In a wireless communication system, a wireless base station AP includes, as shown in FIG. 18, a location (position) information acquisition unit 500 capable of acquiring its own location (position) information.

This configuration enables the wireless base station AP to acquire its own location information and to adjust an interference area of a wireless channel in which channel interference occurs in consideration of its own location information.

Therefore, the wireless base station AP allocates a wireless channel in consideration of its own location information. Accordingly, it is possible to allocate a suitable wireless channel in which an occurrence rate of interference is low.

Hereinafter, the wireless communication will be described with reference to FIGS. 18 to 20.

First, an internal configuration of the wireless base station AP that constitutes the wireless communication system will be described with reference to FIG. 18.

The wireless base station AP that constitutes the wireless communication system includes the location information acquisition unit 500 as shown in FIG. 18.

The location information acquisition unit 500 is designed to acquire the location information of the wireless base station AP.

A method of acquiring the location information of the wireless base station AP by the location information acquisition unit 500 is not limited. For example, a global positioning system (GPS) is applicable.

The wireless base station AP has the same function as the wireless base station AP according to the first exemplary embodiment shown in FIG. 2 except for the aforementioned configuration.

The wireless base station AP stores the location information of its own acquired by the location information acquisition unit 500 in the storage unit 400.

Figure 19:
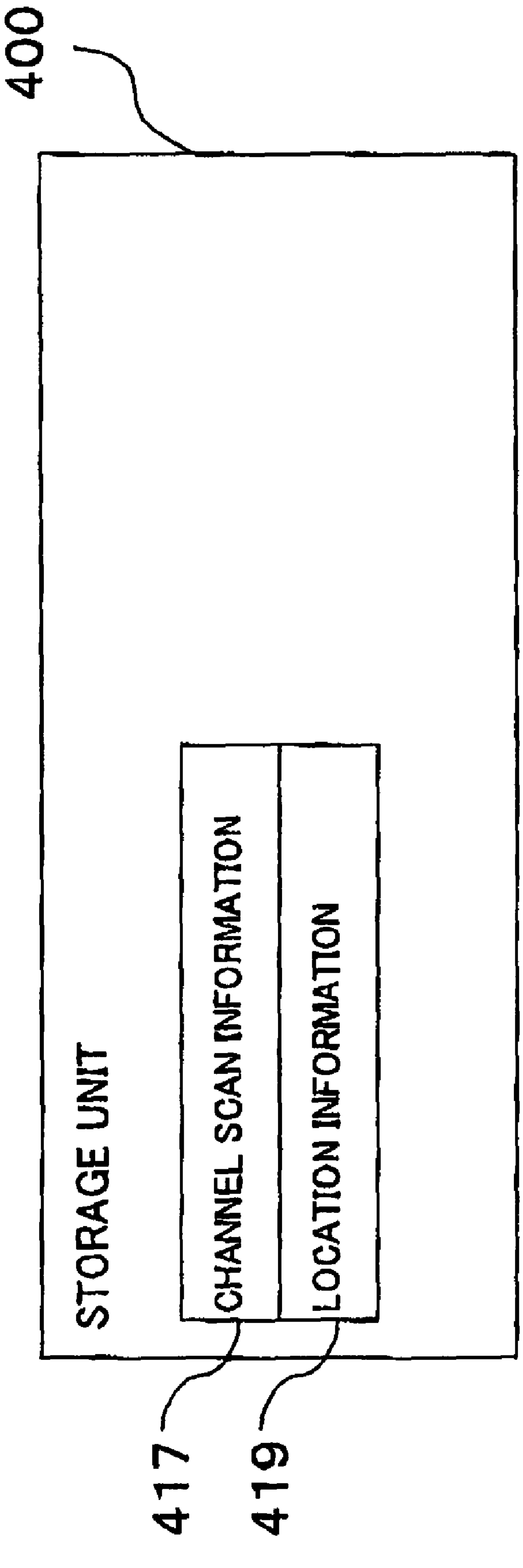
FIG. 19 is a diagram illustrating an internal configuration of a storage unit of a wireless terminal apparatus STA that constitutes the wireless communication system.

An example of a configuration of the storage unit 400 in the wireless base station AP is illustrated in FIG. 19.

As shown in FIG. 19, the wireless base station AP includes location information 419.

This enables the wireless base station AP to adjust an interference area of a wireless channel in which channel interference occurs on the basis of the location information 419 of the wireless base station AP and to allocate a wireless channel in consideration of a location where the wireless base station AP is installed.

Figure 20:
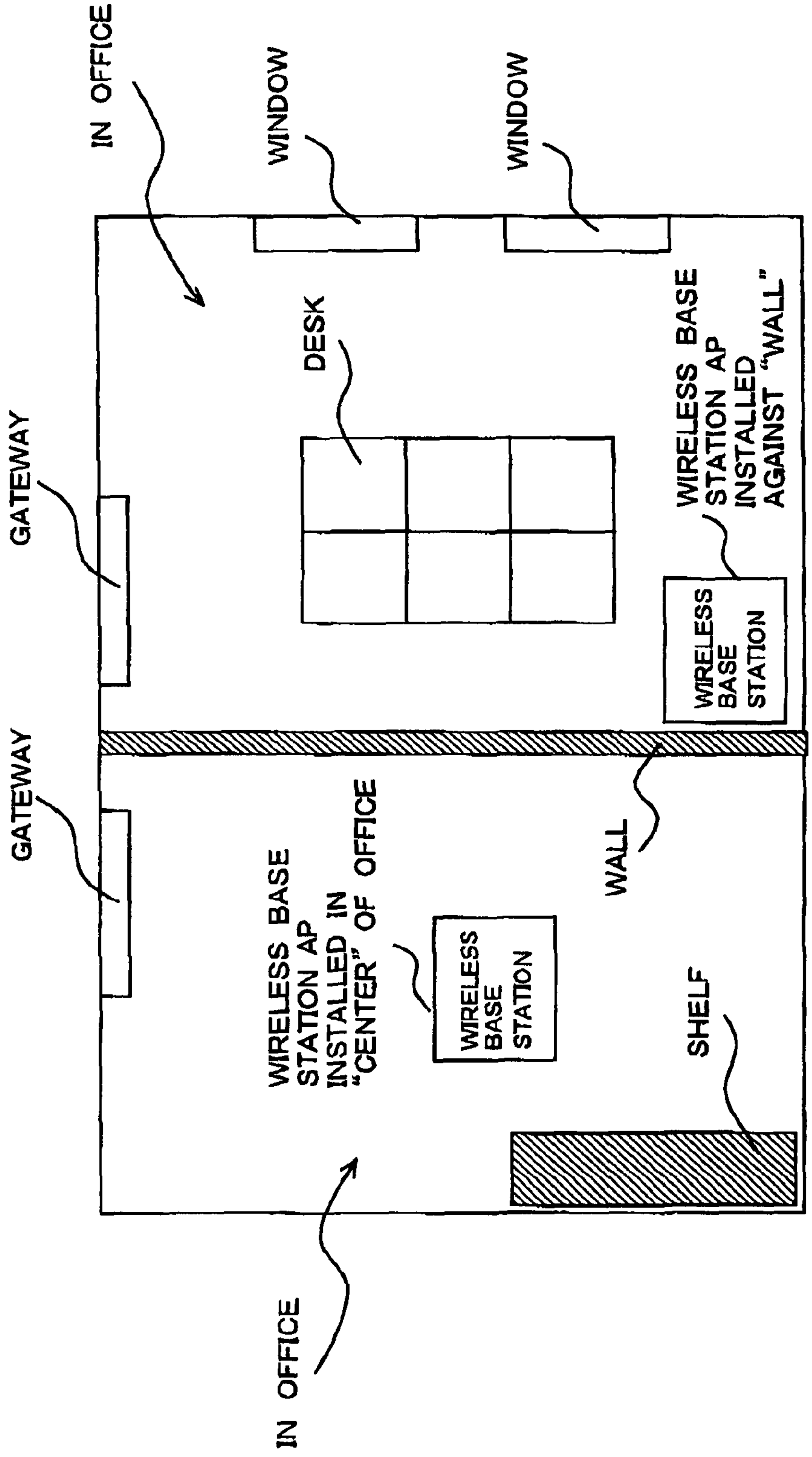
FIG. 20 is a diagram for explaining an environmental condition (map information) in an office in which a wireless base station AP is installed.

For example, the wireless base station AP previously stores in the storage unit 400 map information on an inside of an office, in which the wireless base station AP is installed, shown in FIG. 20. The wireless base station AP analyzes a location where the wireless base station AP is installed in the office on the basis of the location information acquired by the location information acquisition unit 500. As shown in FIG. 20, when it is determined that the wireless base station AP is installed "against the wall" in the office, the wireless base station AP is controlled so that a degree of the channel interference is decreased.

More specifically, the interference area is controlled so that the received signal strength prediction function f(x) is set slightly low by a predetermined value.

As shown in FIG. 20, when the wireless base station AP is determined to be installed at the center of the office, the wireless base station AP is controlled so that a degree of the channel interference is increased.

That is, control is made so that the received signal strength prediction function f(x) is set slightly high by a predetermined value.

This enables the wireless base station AP to adjust an interference area (corresponding to the received signal strength prediction function f(x)) of a wireless channel in which channel interference occurs on the basis of the location information 419 of the wireless base station AP and to allocate a wireless channel in consideration of a location where the wireless base station AP is installed.

It is also possible for the wireless base station AP to acquire the location information 419 of each wireless base station AP from the wireless base station that constitutes a network and to allocate a wireless channel in consideration of the acquired location information of each wireless base station AP.

For example, when the wireless base station AP determines that the wireless base station AP is located in a locally congested area based on the location information of each wireless base station AP, the wireless base station AP makes a control so that the wave interference may not occur.

When the wireless base station AP determines that the wireless base station AP is the outermost wireless base station that constitutes a network, the wireless base station AP is controlled so that the wireless base station AP allocates a channel so as to allow little wave interference to occur.

This allows controlling the wireless base station AP so that the wireless base station AP allocates a channel in consideration of an installation location of each wireless base station AP that constitutes the network.

The channel allocation of the wireless base station AP is described. Also in the roaming process, it is also possible to control the wireless base station AP so that the wireless terminal apparatus STA accesses the wireless base station AP to which the wireless terminal apparatus STA can roam in consideration of the location information of the wireless terminal apparatus STA and the location information of neighboring wireless base stations APs.

For example, when it is determined that there are a plurality of wireless base stations with the same received signal strength in the vicinity of the wireless terminal apparatus STA, the wireless terminal apparatus STA can be controlled so that the wireless terminal apparatus STA preferentially accesses a wireless base station AP located in an area where wireless base stations APs are not congested on the basis of the location information of the wireless terminal apparatus STA and the location information of the neighboring wireless base stations APs.

The embodiments described above are exemplary embodiments of the present invention. The invention may, however, be embodied in many different forms and should not be construed as being limited to the embodiments set forth herein.

For example, ranges of wireless channels are different from each other depending on wireless methods or countries. For this reason, the ranges or the wireless channels are arbitrarily set and changed according to wireless methods and countries, and the aforementioned processes are performed in the ranges of the wireless channels.

A control process of a wireless apparatus such as a wireless base station AP and a wireless terminal apparatus STA that constitutes the wireless communication system may be executed through hardware, software, or a combination thereof.

When the control process is executed through software, a program recording a process sequence may be installed in a memory in dedicated hardware in a computer and executed, or installed in a general use computer that executes various processes and executed.

For example, the program may be stored in a computer-readable medium such as hard disks or read-only memories (ROMs) in advance.

Alternatively, the program may be temporarily or permanently stored in floppy disks, compact disc read-only memories (CD-ROMs), magneto optical (MO) disks, digital versatile discs (DVDs), magnetic disks, and removable recording media such as semiconductor memories.

The removable recording media may be provided as so-called "package software."

In addition to the program being installed in a computer from the removable recording media, the program may be wirelessly transferred to a computer from a download site or through a network such as the Internet. The computer may receive the transferred program and may install the program in a recording medium such as a hard disk.

The program may be executed according to the processes described in the exemplary embodiments in time series, or may be paratactically or individually executed according to a processing ability of an apparatus which performs the processes or as needed.

Further, the wireless communication system may have a logical group configuration of a plurality of apparatuses or may be constructed to combine functions of the apparatuses.

As described in the aforementioned exemplary embodiments, the exemplary embodiments have the following features.

An interference prediction apparatus that predicts a wireless channel in which channel interference occurs (will occur) includes a measurement unit that measures a received signal strength for each wireless channel and a prediction unit that predicts an interference area of the wireless channel in which channel interference occurs for each wireless channel on the basis of the received signal strength for each wireless channel.

In the interference prediction apparatus, the prediction unit may calculate an interference area for each wireless channel according to the received signal strength for each wireless channel and predicts the interference area for each wireless channel.

The interference prediction apparatus may further include an acquisition unit that acquires location information of the interference prediction apparatus and an interference area adjustment unit that adjusts the interference area depending on the location information.

The interference prediction apparatus may further include a wireless channel selection unit that selects a wireless channel to be used for wireless communication on the basis of the received signal strength for each wireless channel and the interference area for each wireless channel, and a channel allocation unit that allocates the wireless channel selected by the wireless channel selection unit as the wireless channel to be used for wireless communication.

The interference prediction apparatus may further include a calculation unit that calculates an interference-avoidance received signal strength for avoiding an occurrence of channel interference for each wireless channel on the basis of the received signal strength for each wireless channel and the interference area for each wireless channel, wherein the wireless channel selection unit selects the wireless channel to be used for wireless communication on the basis of the interference-avoidance received signal strength calculated for each wireless channel.

In the interference prediction apparatus, the calculation unit may calculate the received signal strength for each wireless channel including the received signal strength for each wireless channel and the interference area for each wireless channel.

In the interference prediction apparatus, the wireless channel selection unit may specify a wireless channel corresponding to the least interference-avoidance received signal strength among corresponding wireless channels on the basis of the interference-avoidance received signal strength calculated for each wireless channel, and may select the specified wireless channel as the wireless channel to be used for wireless communication.

In the interference prediction apparatus, the wireless channel selection unit may select the wireless channel to be used for wireless communication, in consideration of an interference-avoidance received signal strength of a wireless channel adjacent to the wireless channel, when there exist a plurality of wireless channels corresponding to the least interference-avoidance received signal strength.

In the interference prediction apparatus, the wireless channel selection unit may specify a wireless channel corresponding to an interference-avoidance received signal strength less than a predetermined threshold among corresponding wireless channels on the basis of the interference-avoidance received signal strength calculated for each wireless channel, and may select the specified wireless channel as the wireless channel to be used for wireless communication.

In the interference prediction apparatus, the wireless channel selection unit may specify a wireless channel corresponding to the least interference-avoidance received signal strength among corresponding wireless channels when a plurality of wireless channels exist corresponding to the interference-avoidance received signal strength less than the predetermined threshold.

In the interference prediction apparatus, the wireless channel selection unit may select the wireless channel to be used for wireless communication, in consideration of an interference-avoidance received signal strength of a wireless channel adjacent to the wireless channel, when a plurality of wireless channels exist corresponding to the interference-avoidance received signal strength less than the predetermined threshold.

The interference prediction apparatus may further include a wireless base station selection unit that selects a wireless base station that is accessed by the interference prediction apparatus on the basis of the received signal strength for each wireless channel and the interference area for each wireless channel, and a wireless base station access unit that accesses the wireless base station selected by the wireless base station selection unit.

The interference prediction apparatus may further include a calculation unit that calculates for each wireless channel an interference-avoidance received signal strength for avoiding an occurrence of channel interference on the basis of the received signal strength for each wireless channel and the interference area for each wireless channel, wherein the wireless base station selection unit selects the wireless base station on the basis of the interference-avoidance received signal strength calculated for each wireless channel.

In the interference prediction apparatus, the calculation unit may calculate for each wireless channel the interference-avoidance received signal strength including the received signal strength for each wireless channel and the interference area for each wireless channel.

In the interference prediction apparatus, the wireless base station selection unit may include a received signal strength specification unit that specifies an interference-avoidance received signal strength corresponding to an accessible wireless base station that accesses the interference prediction apparatus among an interference-avoidance received signal strengths calculated for wireless channels. The wireless base station selection unit may select the wireless base station based on the interference-avoidance received signal strength corresponding to the accessible wireless base station.

In the interference prediction apparatus, the wireless base station selection unit may select the wireless base station from among the accessible wireless base stations on the basis of the interference-avoidance received signal strength corresponding to the accessible wireless base station and the received signal strength of the accessible wireless base station.

In the interference prediction apparatus, the wireless base station selection unit may specify an accessible wireless base station in which a difference between the interference-avoidance received signal strength corresponding to the accessible wireless base station and the received signal strength of the accessible wireless base station is minimized, and may select the specified accessible wireless base station as the wireless base station.

In the interference prediction apparatus, the wireless base station selection unit may select the wireless channel, in consideration of an interference-avoidance received signal strength of a wireless channel adjacent to the wireless channel of the accessible wireless base station, when a plurality of accessible wireless base stations exist in which the difference is minimized.

In the interference prediction apparatus, the wireless base station selection unit may specify an accessible wireless base station in which a difference between the interference-avoidance received signal strength corresponding to the accessible wireless base station and the received signal strength of the accessible wireless base station is less than a predetermined threshold, and may select the specified accessible wireless base station as the wireless base station.

In the interference prediction apparatus, the wireless base station selection unit may specify an accessible wireless base station in which a difference between the interference-avoidance received signal strength corresponding to the accessible wireless base station and the received signal strength of the accessible wireless base station is minimized, when a plurality of accessible wireless base stations exist in which the difference is less than a predetermined threshold.

In the interference prediction apparatus, the wireless base station selection unit may select the wireless channel, in consideration of an interference-avoidance received signal strength of a wireless channel adjacent to the wireless channel of the accessible wireless base station, when a plurality of accessible wireless base stations exist in which the difference is less than the predetermined threshold.

An interference prediction method that predicts a wireless channel in which channel interference occurs includes measuring a received signal strength for each wireless channel and predicting an interference area of the wireless channel in which channel interference occurs on the basis of the received signal strength for each wireless channel.

In the interference prediction method, the prediction may calculate an interference area according to the received signal strength for each wireless channel, and may predict the interference area for each wireless channel.

An interference prediction program in a computer-readable medium may cause a computer to perform a measurement process of measuring a received signal strength for each wireless channel and a prediction process of predicting an interference area of the wireless channel in which channel interference occurs according to the received signal strength for each wireless channel.

In the interference prediction program, the prediction process calculates an interference area depending on the received signal strength for each wireless channel, and predicts the interference area for each wireless channel.

It is possible to apply the interference prediction apparatus, the interference prediction method, and the interference prediction program to an application for reducing channel interference among a plurality of wireless base stations APs.

It is also possible to apply the interference prediction apparatus, the interference prediction method, and the interference prediction program to an application for roaming to the plurality of wireless base stations.

Further, it is possible to apply the interference prediction apparatus, the interference prediction method, and the interference prediction program to an application for allocating a communication channel among wireless apparatuses such as wireless terminal apparatus, a mobile phone, a transceiver, a radio control, and the like of which available frequency bands are limited, in addition to the wireless base station AP, and to an application for roaming thereto.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An interference prediction apparatus that predicts a wireless channel in which channel interference will occur, the interference prediction apparatus comprising:

a measurement unit that measures a received signal strength for each wireless channel;

a prediction unit that predicts an interference area of a wireless channel in which channel interference will occur for each wireless channel on the basis of the received signal strength for each wireless channel;

a wireless channel selection unit that selects a wireless channel to be used for wireless communication on the basis of the received signal strength for said each wireless channel and the interference area for said each wireless channel;

a channel allocation unit that allocates the wireless channel selected by the wireless channel selection unit as the wireless channel to be used for wireless communication; and a calculation unit that calculates an interface-avoidance received signal strength for avoiding an occurrence of channel interference for said each wireless channel on the basis of the received signal strength for said each wireless channel and the interference area for said each wireless channel, wherein the wireless channel selection unit selects the wireless channel to be used for wireless communication on the basis of the interference-avoidance received signal strength calculated for said each wireless channel, wherein the wireless channel selection unit specifies a wireless channel corresponding to the least interference-avoidance received signal strength among corresponding wireless channels on the basis of the interference-avoidance received signal strength calculated for said each wireless channel, and calculates the specified wireless channel as the wireless channel to be used for wireless communication, and wherein the wireless channel selection unit selects the wireless channel to be used for wireless communication, in consideration of an interference-avoidance received signal strength of both neighboring wireless channels, when a plurality of wireless channels exists corresponding to the least interference-avoidance received signal strength.

2. The interference prediction apparatus according to claim 1, further comprising:

a wireless base station selection unit that selects a wireless base station that is accessed by the interference prediction apparatus on the basis of the received signal strength for said each wireless channel and the interference area for said each wireless channel, wherein the wireless base station selection unit specifies an accessible wireless base station in which a difference between an interference-avoidance received signal strength corresponding to the accessible wireless base station and a received signal strength of the accessible wireless base station is minimized, and selects the specified accessible wireless base station as the wireless base station.

3. The interference prediction apparatus according to claim 1, further comprising:

a wireless base station selection unit that selects a wireless base station that is accessed by the interference prediction apparatus, the wireless base station selection unit specifying an accessible wireless base station in which a difference between an interference-avoidance received signal strength corresponding to the accessible wireless base station and a received signal strength of the accessible wireless base station is minimized.

4. The interference prediction apparatus according to claim 1, further comprising:

a wireless base station selection unit that selects a wireless base station that is accessed by the interference prediction apparatus on the basis of the received signal strength for said each wireless channel and the interference area for said each wireless channel, wherein the wireless base station selection unit specifies an accessible wireless base station in which a difference between an interference-avoidance received signal strength corresponding to the accessible wireless base station and a received signal strength of the accessible wireless base station is less than a predetermined threshold, and selects the specified accessible wireless base station as the wireless base station.

5. The interference prediction apparatus according to claim 1, further comprising:

a wireless base station selection unit that selects a wireless base station that is accessed by the interference prediction apparatus, the wireless base station selection unit specifying an accessible wireless base station in which a difference between an interference-avoidance received signal strength corresponding to the accessible wireless base station and a received signal strength of the accessible wireless base station is less than a predetermined threshold.

6. An interference prediction apparatus that predicts a wireless channel in which channel interference will occur, the interference prediction apparatus comprising:

a measurement unit that measures a received signal strength for each wireless channel;

a prediction unit that predicts an interference area of a wireless channel in which channel interference will occur for each wireless channel on a basis of the received signal strength for each wireless channel;

a wireless base station selection unit that selects a wireless base station that is accessed by the interference prediction apparatus on a basis of the received signal strength for said each wireless channel and the interference area for said each wireless channel;

a wireless base station access unit that accesses the wireless base station selected by the wireless base station selection unit; and a calculation unit that calculates for said each wireless channel an interference-avoidance received signal strength for avoiding an occurrence of channel interference on the basis of the received signal strength for said each wireless channel and the interference area for said each wireless channel, wherein the wireless base station selection unit selects the wireless base station on a basis of the interference-avoidance received signal strength each wireless channel, wherein the wireless base station selection unit includes a received signal strength specification unit that specifies an interference-avoidance received signal strength corresponding to an accessible wireless base station that can access the interference prediction apparatus among interference-avoidance received signal strengths calculated for said each wireless channel, wherein the wireless base station selection unit selects the wireless base station on a basis of the interference-avoidance received signal strength corresponding to the accessible wireless base station, wherein the wireless base station selection unit selects the wireless base station from among the accessible wireless base stations on a basis of an interference-avoidance received signal strength corresponding to the accessible wireless base station and a received signal strength of the accessible wireless base station, and wherein the wireless base station selection unit specifies an accessible wireless base station in which a difference between the interference-avoidance received signal strength corresponding to the accessible wireless base station and the received signal strength of the accessible wireless base station is minimized, and selects the specified accessible wireless base station as the wireless base station.

7. The interference prediction apparatus according to claim 6, wherein the wireless base station selection unit selects the wireless channel, in consideration of an interference-avoidance received signal strength of a wireless channel adjacent to the wireless channel of the accessible wireless base station, when a plurality of accessible wireless base stations exists in which the difference is minimized.

8. An interference prediction apparatus that predicts a wireless channel in which channel interference will occur, the interference prediction apparatus comprising:

a measurement unit that measures a received signal strength for each wireless channel;

a prediction unit that predicts an interference area of a wireless channel in which channel interference will occur for each wireless channel on a basis of the received signal strength for each wireless channel;

a wireless base station selection unit that selects a wireless base station that is accessed by the interference prediction apparatus on a basis of the received signal strength for said each wireless channel and the interference area for said each wireless channel;

a wireless base station access unit that accesses the wireless base station selected by the wireless base station selection unit; and a calculation unit that calculates for said each wireless channel an interference-avoidance received signal strength for avoiding an occurrence of channel interference on the basis of the received signal strength for said each wireless channel and the interference area for said each wireless channel, wherein the wireless base station selection unit selects the wireless base station on a basis of the interference-avoidance received signal strength calculated for said each wireless channel, wherein the wireless base station selection unit includes a received signal strength specification unit that specifies an interference-avoidance received signal strength corresponding to an accessible wireless base station that can access the interference prediction apparatus among interference-avoidance received signal strengths calculated for said each wireless channel, wherein the wireless base station selection unit selects the wireless base station on a basis of the interference-avoidance received signal strength corresponding to the accessible wireless base station, wherein the wireless base station selection unit selects the wireless base station from among the accessible wireless base stations on a basis of an interference-avoidance received signal strength corresponding to the accessible wireless base station and a received signal of the accessible wireless base station, and wherein the wireless base station selection unit specifies an accessible wireless base station in which a difference between the interference-avoidance received signal strength corresponding to the accessible wireless base station and the received signal strength of the accessible wireless base station is less than a predetermined threshold, and selects the specified accessible wireless base station as the wireless base station.

9. The interference prediction apparatus according to claim 8, wherein the wireless base station selection unit specifies an accessible wireless base station in which a difference between the interference-avoidance received signal strength corresponding to the accessible wireless base station and the received signal strength of the accessible wireless base station is minimized, when a plurality of accessible wireless base stations exists in which the difference is less than the predetermined threshold.

10. The interference prediction apparatus according to claim 8, wherein the wireless base station selection unit selects the wireless channel, in consideration of an interference-avoidance received signal strength of a wireless channel adjacent to the wireless channel of the accessible wireless base station, when a plurality of accessible wireless base stations exists in which the difference is less than the predetermined threshold.

* * * * *